(12) United States Patent
Yoshida et al.

(10) Patent No.: US 10,895,730 B2
(45) Date of Patent: Jan. 19, 2021

(54) INFORMATION PROCESSING APPARATUS, INFORMATION PROCESSING METHOD, PROGRAM, AND VISION MEASURING APPARATUS WITH HIGH SPEED AUTOFOCUS

(71) Applicant: Mitutoyo Corporation, Kawasaki (JP)

(72) Inventors: Hiroyuki Yoshida, Kawasaki (JP); Yukimasa Nishio, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 16/358,836

(22) Filed: Mar. 20, 2019

(65) Prior Publication Data

US 2019/0293917 A1 Sep. 26, 2019

(30) Foreign Application Priority Data

Mar. 22, 2018 (JP) ................. 2018-054688

(51) Int. Cl.
*G02B 21/36* (2006.01)
*G03B 13/36* (2006.01)
*G02B 21/24* (2006.01)

(52) U.S. Cl.
CPC ......... *G02B 21/365* (2013.01); *G02B 21/244* (2013.01); *G03B 13/36* (2013.01)

(58) Field of Classification Search
CPC .... G02B 21/365; G02B 21/244; G03B 13/36; H04N 5/232123; H04N 5/23212; H04N 5/232; H04N 5/232127
See application file for complete search history.

(56) References Cited

U.S. PATENT DOCUMENTS

| 2012/0211638 | A1* | 8/2012 | Yoshida | G03B 13/36 250/201.2 |
| 2012/0212607 | A1* | 8/2012 | Yoshida | G01B 11/24 348/135 |
| 2013/0176617 | A1* | 7/2013 | Tamura | G02B 21/00 359/383 |
| 2014/0333762 | A1* | 11/2014 | Yoshida | G02B 7/38 348/135 |
| 2015/0070566 | A1 | 3/2015 | Yoshida | |

FOREIGN PATENT DOCUMENTS

JP 2015-055770 3/2015

* cited by examiner

*Primary Examiner* — Padma Haliyur
(74) *Attorney, Agent, or Firm* — Rankin, Hill & Clark LLP

(57) ABSTRACT

An information processing apparatus includes: an obtaining unit configured to obtain a manually-taken object image group, the manually-taken object image group including a plurality of object images, the plurality of object images being generated by taking images of an object while moving a focal position of an image pickup device manually; a first calculator capable of calculating, based on pieces of contrast information on the plurality of object images in the obtained manually-taken object image group, a first in-focus position of the image pickup device relative to the object by performing fitting using a predetermined function; and a driver capable of moving, based on an autofocus instruction input by a user, the focal position of the image pickup device to the calculated first in-focus position.

17 Claims, 24 Drawing Sheets

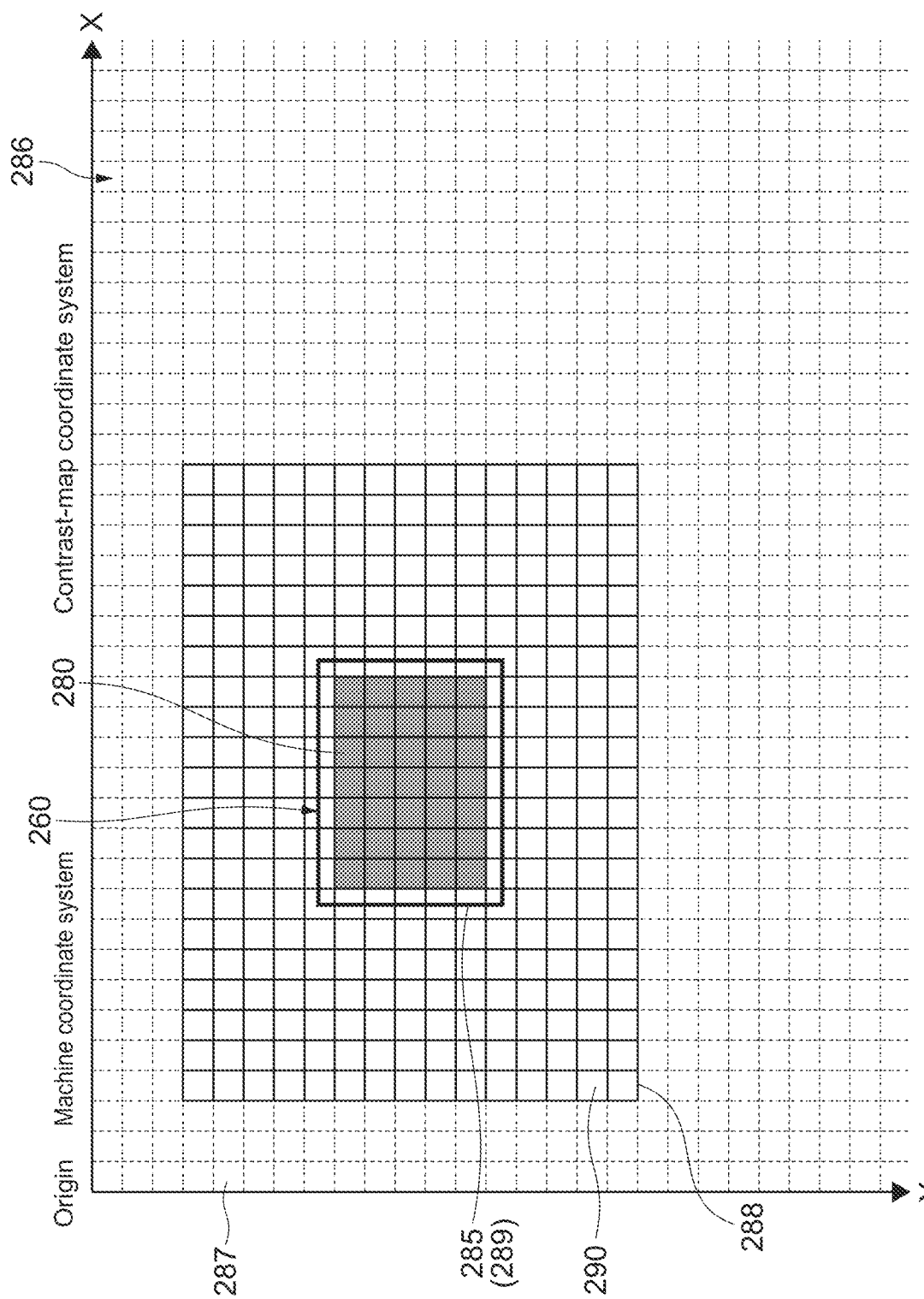

INFORMATION PROCESSING APPARATUS, INFORMATION PROCESSING METHOD, PROGRAM, AND VISION MEASURING APPARATUS WITH HIGH SPEED AUTOFOCUS

CROSS REFERENCE TO RELATED APPLICATIONS

This application claims the benefit of Japanese Priority Patent Application JP 2018-054688 filed Mar. 22, 2018, the entire contents of which are incorporated herein by reference.

BACKGROUND

The present disclosure relates to an information processing apparatus, an information processing method, a program, and a vision measuring apparatus, which are used when taking an image of an object for measurement, observation, or the like, for example.

BACKGROUND ART

There is known a system in which a computer processes an image, which is a taken image of an object, for observation, measurement, or the like. Such a system is used in for example examination, in which an enlarged image obtained by a microscope is used, CNC (Computer Numerical Control) measurement, or the like.

The vision measuring apparatus disclosed in Japanese Patent Application Laid-open No. 2015-55770 calculates a first in-focus position that is an approximate focus position, based on pieces of contrast information on a manually-taken object image group including a plurality of object images taken while manually moving a focal position. A search range is set with reference to the calculated first in-focus position, and an image of an object is taken while automatically moving the focal position within the search range. A second in-focus position that is a final focus position is calculated based on pieces of contrast information on the taken object images in the automatically-taken object image group. As a result, it is possible to sufficiently prevent needless scanning from occurring in scanning in which the focal position is automatically moved, and calculate the final focus position at a high velocity.

SUMMARY

It is desirable to provide a technology capable of reducing the time of autofocus by calculating the in-focus position at a high velocity as described above.

In view of the circumstances as described above, it is an object of the present disclosure to provide an information processing apparatus, an information processing method, a program, and a vision measuring apparatus capable of reducing the time of autofocus by calculating an in-focus position at a high velocity.

Solution to Problem

According to an embodiment of the present disclosure, an information processing apparatus includes an obtaining unit; a first calculator; and a driver.

The obtaining unit is configured to obtain a manually-taken object image group, the manually-taken object image group including a plurality of object images, the plurality of object images being generated by taking images of an object while moving a focal position of an image pickup device manually.

The first calculator is capable of calculating, based on pieces of contrast information on the plurality of object images in the obtained manually-taken object image group, a first in-focus position of the image pickup device relative to the object by performing fitting using a predetermined function.

The driver is capable of moving, based on an autofocus instruction input by a user, the focal position of the image pickup device to the calculated first in-focus position.

This information processing apparatus performs, for example, fitting using a model function based on the pieces of contrast information on the manually-taken object image group, the manually-taken object image group including the plurality of object images taken while manually moving the focal position. As a result, it is possible to calculate the first in-focus position of the image pickup device for the object at a high velocity. Since it only needs to move the focal position to the calculated first in-focus position for an autofocus instruction input by a user, it is possible to reduce the time of autofocus.

The information processing apparatus may further include a reliability calculator configured to calculate reliability of the calculated first in-focus position. In this case, the driver may be configured to move, if the reliability of the calculated first in-focus position has a value larger than a predetermined threshold, the focal position of the image pickup device to the calculated first in-focus position.

The information processing apparatus may further include a second calculator capable of calculating, if the reliability of the calculated first in-focus position has a value smaller than the predetermined threshold, a second in-focus position of the image pickup device relative to the object.

The obtaining unit may be capable of obtaining pieces of focal position information on the plurality of object images in the manually-taken object image group. In this case, the reliability calculator may be configured to calculate the reliability of the first in-focus position based on the pieces of obtained focal position information.

The first calculator may be configured to calculate a contrast peak value by performing the fitting, and to calculate the focal position corresponding to the contrast peak value as the first in-focus position. In this case, the reliability calculator may be configured to calculate the reliability of the first in-focus position based on the contrast peak value.

The driver may be capable of controlling an operation of moving the focal position corresponding to a manual operation for moving the focal position by a user.

The driver may be capable of controlling a moving velocity of the focal position and a change of the moving velocity of the focal position.

The information processing apparatus may further include a notification unit capable of outputting notification information regarding the reliability of the calculated first in-focus position.

The notification information may include at least one of information regarding the reliability of the calculated first in-focus position and information regarding an operation method of manually moving the focal position by a user.

The information processing apparatus may further include a determining unit configured to determine whether or not the contrast peak value can be calculated. In this case, the first calculator may be configured to calculate the first in-focus position every time the determining unit determines that the contrast peak value can be calculated.

The first calculator may be configured to calculate the first in-focus position based on the first in-focus position calculated in the past and based on reliability of the first in-focus position calculated in a past. In this case, the reliability calculator is configured to calculate the reliability of the first in-focus position based on the reliability of the first in-focus position calculated in a past.

The first calculator may be configured to weight the first in-focus position based on the reliability of the first in-focus position calculated in a past to calculate the first in-focus position.

The obtaining unit may be capable of obtaining an automatically-taken object image group, the automatically-taken object image group including a plurality of object images, the plurality of object images being generated by taking images of the object while moving the focal position of the image pickup device automatically. In this case, the second calculator may be configured to calculate the second in-focus position based on the calculated first in-focus position and based on pieces of contrast information on the plurality of object images in the obtained automatically-taken object image group.

The information processing apparatus may further include a selecting unit configured to select a normal mode and a high accuracy mode regarding autofocus in a switchable manner. In this case, the driver may be capable of moving, if the normal mode is being selected, the focal position of the image pickup device to the calculated first in-focus position based on an autofocus instruction input by the user, and moving, if the high accuracy mode is being selected, the focal position of the image pickup device to one of end points of a search range with reference to the calculated first in-focus position based on an autofocus instruction input by the user.

The information processing apparatus may further include a third calculator capable of calculating, if the high accuracy mode is being selected, a third in-focus position of the image pickup device relative to the object based on pieces of contrast information on a plurality of object images generated by taking images of the object while moving the focal position automatically within the search range.

The determining unit may be configured to determine that the first in-focus position is invalid if a predetermined time period passes after the first in-focus position is calculated and the autofocus instruction is not input within the predetermined time period.

The information processing apparatus may further include storage configured to store a map-for-calculation including a plurality of divided areas. The first calculator may be configured to calculate divided-area in-focus positions based on pieces of contrast information on a plurality of divided areas, the plurality of divided areas being obtained by dividing the object image corresponding to a plurality of areas of the map-for-calculation, and to calculate the first in-focus position based on pieces of information on the divided-area in-focus positions.

The first calculator may be configured to calculate the first in-focus position based on the pieces of information on the divided-area in-focus positions for calculation-object areas, the calculation-object areas being some divided areas of the plurality of divided areas, the some divided areas overlapping with a reference area in the object image, the reference area being a reference to calculate the first in-focus position.

The first calculator may be configured to weight the calculation-object areas based on sizes of areas overlapping with the reference area and based on pieces of contrast information on the calculation-object areas, and to calculate the first in-focus position.

The driver may be configured to move the focal position to one of end points of the search range at a first velocity, and to move the focal position within the search range at a second velocity lower than the first velocity.

The image pickup device may be capable of taking an image of the object at an arbitrary image pickup position on a 2D (two-dimensional) plane parallel to a mount surface on which the object is mounted. In this case, the driver may be capable of moving the image pickup position on the 2D plane. Further, the map-for-calculation may have a larger area than an image pickup area of the object image, the map-for-calculation containing the image pickup area, the map-for-calculation being moved as the image pickup position is moved.

The storage may be configured to store pieces of contrast information and pieces of divided-area in-focus position information on divided areas of the object image for areas of the map-for-calculation, the divided areas of the object image corresponding to the areas of the map-for-calculation. In this case, the first calculator may be configured, if the image pickup position is moved, to refer to the pieces of contrast information and the pieces of divided-area in-focus position information on the areas of the map-for-calculation, the pieces of contrast information and the pieces of divided-area in-focus position information being stored before the image pickup position is moved, and to calculate the divided-area in-focus positions of divided areas of the moved object image.

The obtaining unit may be configured to obtain the plurality of object images, the plurality of object images being obtained by taking images of the object, the images of the object being formed by an optical system including an objective lens. In this case, the storage may be configured to store the map-for-calculation for the objective lens of the optical system, the map-for-calculation being used to calculate the first in-focus position.

According to an embodiment of the present disclosure, there is provided an information processing method executed by a computer.

A manually-taken object image group is obtained, the manually-taken object image group including a plurality of object images, the plurality of object images being generated by taking images of an object while moving a focal position of an image pickup device manually.

Based on pieces of contrast information on the plurality of object images in the obtained manually-taken object image group, a first in-focus position of the image pickup device relative to the object is calculated by performing fitting using a predetermined function; and Based on an autofocus instruction input by a user, the focal position of the image pickup device is moved to the calculated first in-focus position.

According to an embodiment of the present disclosure, there is provided a program, causing a computer to execute the steps of:

obtaining a manually-taken object image group, the manually-taken object image group including a plurality of object images, the plurality of object images being generated by taking images of an object while moving a focal position of an image pickup device manually;

calculating, based on pieces of contrast information on the plurality of object images in the obtained manually-taken object image group, a first in-focus position of the image pickup device relative to the object by performing fitting using a predetermined function; and moving, based on an autofocus instruction input by a user, the focal position of the image pickup device to the calculated first in-focus position.

According to an embodiment of the present disclosure, there is provided a vision measuring apparatus including an image pickup unit, the above-mentioned obtaining unit, the above-mentioned first calculator, and the above-mentioned driver.

The image pickup unit is capable of generating object images by taking images of an object.

As described above, according to the present disclosure, it is possible to reduce the time of autofocus by calculating an in-focus position at a high velocity.

BRIEF DESCRIPTION OF DRAWINGS

FIG. 15 is a diagram illustrating the way to set a plurality of divided areas;

DETAILED DESCRIPTION OF EMBODIMENTS

Hereinafter, an embodiment of the present disclosure will be described with reference to the drawings.

[Configuration of Vision Measuring Apparatus]

Figure 1:
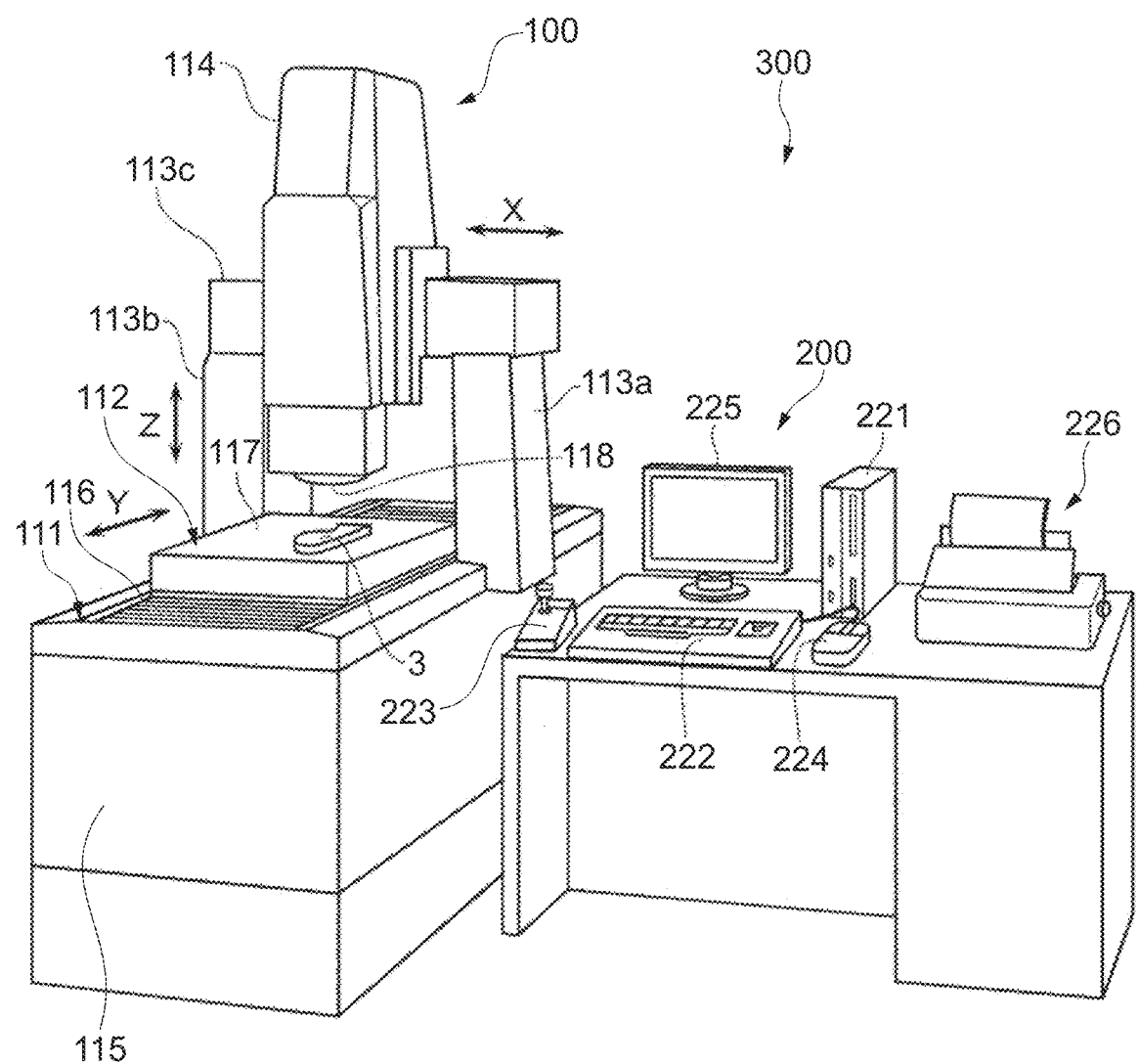
FIG. 1 is a diagram schematically showing an example of the configuration of a vision measuring apparatus according to an embodiment of the present disclosure.

FIG. 1 is a diagram schematically showing an example of the configuration of a vision measuring apparatus according to an embodiment of the present disclosure. A vision measuring apparatus 300 includes a contactless vision measuring system 100 and a PC (Personal Computer) 200. The PC 200 drives and controls the vision measuring system 100, and processes data as necessary. The PC 200 functions as an information processing apparatus of this embodiment. Note that any computer other than a PC may be used as the information processing apparatus of this embodiment.

The vision measuring system 100 includes a mount 111, a stage 112, and an image pickup unit 114. The mount 111 is a means for moving a sample. The stage 112 is mounted on the mount 111. The image pickup unit 114 is arranged above the stage 112.

The mount 111 includes a base 115. The base 115 includes a main surface 116. The main surface 116 has short sides in a first direction (X-axis direction) and long sides in a second direction (Y-axis direction). The first direction is orthogonal to the second direction. Two columns 113a and 113b are arranged on the two long sides of the base 115, respectively. The two columns 113a and 113b extend upward (in Z-axis direction). A guide 113c is arranged between the two columns 113a and 113b. The guide 113c extends in the X-axis direction.

The stage 112 includes a mount surface 117. A work 3, i.e., a measured object, is mounted on the mount surface 117. The mount surface 117 is mounted on the main surface 116 of the mount 111 such that the mount surface 117 may be in parallel to the horizontal direction. The mount 111 includes a Y-axis driver mechanism (not shown) on the main surface 116. The Y-axis driver mechanism moves the stage 112 in the Y-axis direction. The PC 200 controls the Y-axis driver mechanism. As a result, the stage 112 moves in the Y-axis direction. The configuration of the Y-axis driver mechanism is not limited and may be designed as necessary.

The image pickup unit 114 is mounted on the guide 113c arranged between the two columns 113a and 113b. The guide 113c includes an X-axis driver mechanism (not shown). The PC 200 controls the X-axis driver mechanism. As a result, the image pickup unit 114 moves in the X-axis direction. The configuration of the X-axis driver mechanism is not limited and may be designed as necessary.

A camera 118 is mounted on the image pickup unit 114 such that the camera 118 may face the stage 112. The camera 118 functions as an image pickup device (image pickup unit). The camera 118 includes, for example, a CMOS (Complementary Metal Oxide Semiconductor) or CCD (Charge Coupled Devices) sensor and the like. Another camera may be used.

The camera 118 is capable of generating an object image of an object, i.e., the work 3 by taking an image of the object, i.e., the work 3. The camera 118 is capable of moving in the Z-axis direction (focal-axis direction), i.e., the optical-axis direction. The camera 118 is capable of taking an image of the object, i.e., the work 3, at an arbitrary focal position within a predetermined range. The image pickup unit 114 includes a Z-axis driver mechanism (not shown). The Z-axis driver mechanism moves the camera 118 in the Z-axis direction. The PC 200 controls the Z-axis driver mechanism. As a result, the camera 118 moves in the Z-axis direction. As a result, the focal position of the camera 118 moves.

A user operates a mouse, a joystick box, or the like, whereby the camera 118 moves in the Z-axis direction and the focal position moves. Alternatively, the PC 200 may control the camera 118 to move automatically. As a result, the focal position may move. A user may input an operation, whereby a focal position is moved (i.e., focal position is moved manually). The PC 200 may control and move a focal position (i.e., focal position is moved automatically).

The kind of the vision measuring system 100 is not limited. Any apparatus may be used as long as it for example measures and observes an object image, which is a taken image of the work 3, and as long as it is capable of moving a focal position manually and automatically. For example, the vision measuring system 100 may be an image probe such as a CNC vision measuring system or a CNC 3D (three-dimensional) measuring system, a hardness testing machine, or the like. Further, the present disclosure is applicable to digital microscopes. A digital camera of a digital microscope takes an image of an enlarged image obtained by an optical microscope. In this case, an imaging optical system including an objective lens generates an enlarged image of an object. The image pickup device (image pickup unit) includes the imaging optical system. Typically, the objective lens moves in the Z-axis direction, whereby the focal position is moved.

In the example of FIG. 1, the image pickup unit 114 is driven in the X-axis direction, and the stage 112 is driven in the Y-axis direction. As a result, it is possible to move the image pickup position of the camera 118 in the XY plane direction relative to the mount surface 117 of the stage 112. In other words, the camera 118 of the vision measuring system 100 is capable of taking an image of the work 3 at an arbitrary image pickup position on a 2D plane parallel to the mount surface 117, on which the work 3 is mounted. Note that the image pickup position is the position of an area, whose image is taken by the camera 118 (image pickup area). The camera 118 takes an image (object image) of an area in the image pickup area.

The camera 118 may have any configuration to move the image pickup position in the XY plane direction. For example, the stage 112 is capable of being driven in both the X-axis direction and the Y-axis direction. Further, the image pickup unit 114 is capable of being driven in both the X-axis direction and the Y-axis direction. Alternatively, the stage 112 is capable of being driven in the XY plane direction, the image pickup unit 114 is capable of being driven in the XY plane direction, and the relative position relation between the stage 112 and the image pickup unit 114 may be controlled arbitrarily.

The PC 200 includes a main PC 221, a keyboard 222, a joystick box (hereinafter referred to as J/S) 223, a mouse 224, a display 225, and a printer 226. The keyboard 222, the J/S 223, and the mouse 224 function as operation input units, in which instructions are input by a user. The display 225 functions as a display unit. For example the display 225 is a liquid crystal, EL (Electro-Luminescence), or CRT (Cathode Ray Tube) display device or the like. The printer 226 is capable of, for example, printing out measurement results and the like.

Figure 2:
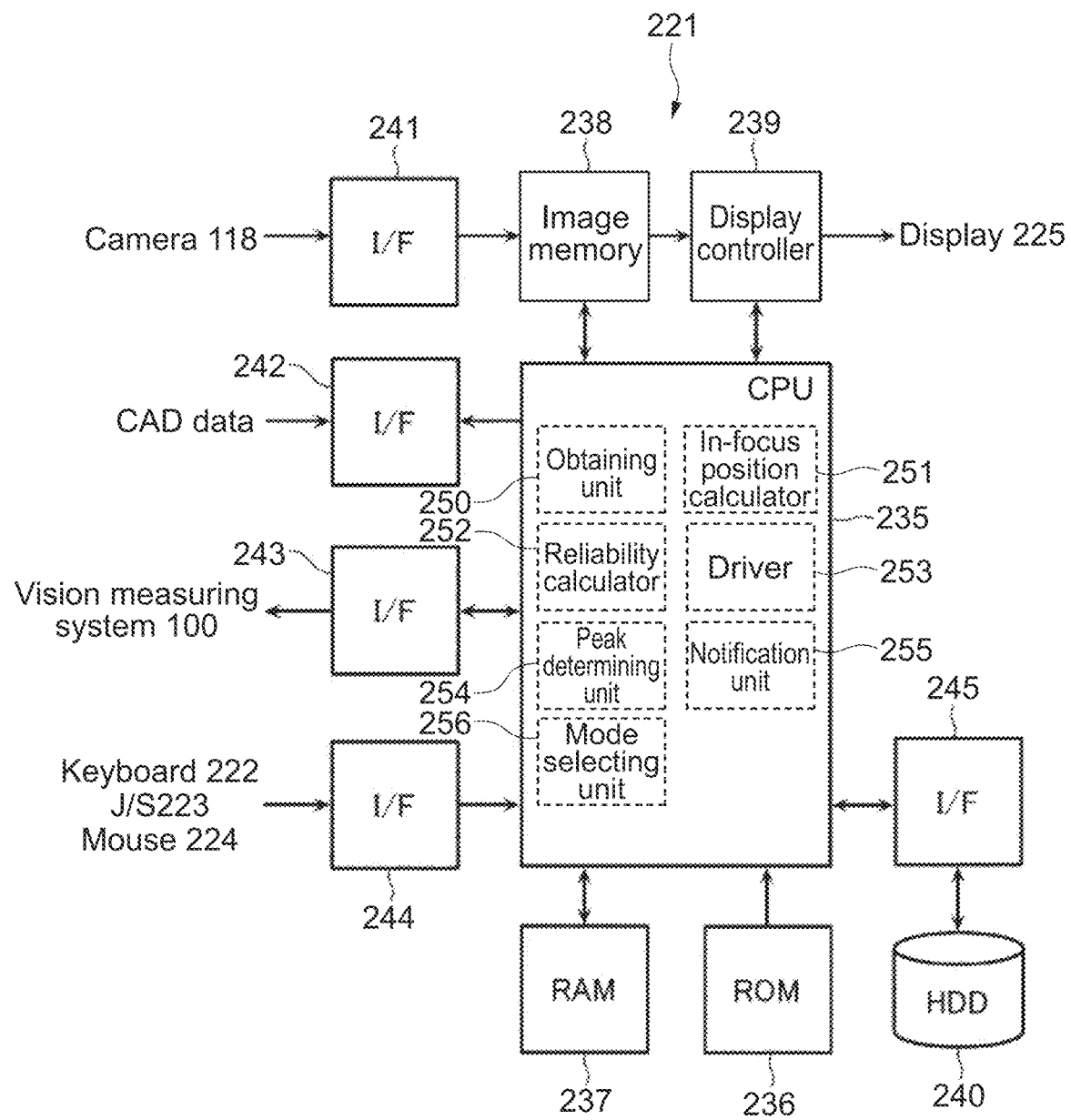
FIG. 2 is a block diagram schematically showing an example of the configuration of a main PC of FIG. 1.

FIG. 2 is a block diagram schematically showing an example of the configuration of the main PC 221. The main PC 221 includes a CPU (Central processing Unit) 235, a ROM (Read Only Memory) 236, a RAM (Random Access Memory) 237, an image memory 238, and a display controller 239. Further, the main PC 221 includes various I/Fs (interfaces) 241 to 245. The vision measuring system 100, the keyboard 222, an HDD (Hard Disk Drive) 240, or the like connects to each of the I/Fs 241 to 245.

The camera 118 takes an object image of the work 3. The camera 118 transfers/inputs information on the object image to/in the image memory 238 via the I/F 241. The image memory 238 stores the information on the object image as a multivalued image. The image information is transferred via a USB cable and a USB port, for example. The USB cable is a general-purpose digital serial communication wire.

In some cases, offline teaching is executed based on CAD (Computer Aided Design) data. In this case, a CAD system (not shown) generates CAD data of the work 3. The CAD data is input in the CPU 235 via the I/F 242. For example, the CPU 235 develops the CAD data input in the CPU 235 into image information such as bitmap. Then, the image memory 238 stores the image information. The display controller 239 displays image information stored in the image memory 238 on the display 225.

The keyboard 222, the J/S 223, and the mouse 224 input code information, position information, and the like. The code information, position information, and the like are input in the CPU 235 via the I/F 244. The ROM 236 stores a macro program. The RAM 237 stores various programs obtained from the HDD 240 via the I/F 245. The CPU 235 executes measurement, displays measurement results, and the like based on the macro program and the various programs. The various programs include, for example, a measuring program, a measurement result display program, and the like. The various programs further include a program for executing the information processing method of the present disclosure.

The CPU 235 is capable of driving and controlling the vision measuring system 100 via the I/F 243 based on the measuring process. For example, a user operates the J/S 223 or the mouse 224 to input information. The X-axis driver mechanism and the Y-axis driver mechanism of the vision measuring system 100 are controlled based on the input information. As a result, the stage 112 and the image pickup unit 114 relatively move in the X-axis direction and the Y-axis direction.

After the stage 112 and the image pickup unit 114 move and settle, the Z-axis driver mechanism is controlled manually or automatically. As a result, the camera 118 moves in the Z-axis direction. Then, the focal position is determined at a focus position that is in focus. An image of the work 3 in focus is taken. Then, the object image of the work 3 in a new image pickup area is displayed on the display 225. How to calculate the focus position will be described in detail later.

Note that the HDD 240 is a storage medium configured to store the various programs, data, and the like. The RAM 237 stores various programs, and supplies a work area for various kinds of processing to the CPU 235. In this embodiment, the HDD 240, the ROM 236, the RAM 237, and the like function as storage. Note that the program may be installed in the PC 200 via a network such as the Internet.

Further, the PC 200 is capable of sending, for example, a signal specifying the frame rate of the camera 118, a signal specifying the light intensity of a lighting device (not shown), and the like. The lighting device irradiates the work 3 with light. The camera 118 takes an image of the work 3 at a frame rate specified by the PC 200. As described above, image information on the taken image is bulk-transferred to the PC 200 via a USB cable or the like. Note that any one of various illuminators may be used as the lighting device. For example, a PWM (Pulse Width Modulation)-controlled LED (Light Emitting Diode) or the like may be used.

A position controller (not shown) or the like of the vision measuring system 100 sends the position information on the camera 118 to the PC 200 as the camera 118 takes an image of an object. For example, Z coordinate values are read from linear scales or the like of the Z-axis driver mechanism in synchronization with the operation of taking an image of the camera 118. The read Z coordinate values are sent as position information on the camera 118 that has taken an image of the object.

As a specific example, the camera 118 outputs a latch signal of Z coordinate values (e.g., which may be a strobe signal or the like) during exposure of the object image. The position controller or the like latches the Z coordinate values based on the output latch signal. The PC 200 obtains the latched Z coordinate values. Alternatively, another process may be executed.

In this embodiment, a position 121 of the camera 118 moves to move the focal position. However, the way to move the focal position is not limited to this. For example, an optical system of the camera 118 including a lens and the like may be adjusted to move a focal position. If a digital microscope is used as the vision measuring system 100, the optical system of the optical microscope may be adjusted (objective lens may be moved, for example) to move a focal position. In other words, a method of moving a focal position of an object image is not limited, and a configuration therefor is not limited.

As schematically shown in FIG. 2, in this embodiment, the CPU 235 operates based on predetermined programs, and implements an obtaining unit 250, an in-focus position calculator 251, a reliability calculator 252, a driver 253, a peak determining unit 254, a notification unit 255, and a mode selecting unit 256.

The obtaining unit 250 obtains an object image generated by the camera 118. In this embodiment, the obtaining unit 250 obtains a manually-taken object image group. The camera 118 takes images of the work 3 while manually moving the position (focal position) of the camera 118 to generate a plurality of object images. The manually-taken object image group includes the plurality of object images. Further, the obtaining unit 250 obtains an automatically-taken object image group. The camera 118 takes images of the work 3 while automatically moving the position (focal position) of the camera 118 to generate a plurality of object images. The automatically-taken object image group includes the plurality of object images.

Further, the obtaining unit 250 is capable of obtaining position information on the camera 118 at the time of taking the obtained image of the object. The position information on the camera 118 corresponds to focal position information on the camera 118 at the time of taking the obtained image of the object. In the present disclosure, the position information (focal position information) on the camera 118 at the time of taking an image of the object is described as position information (focal position information) on the object image in some cases.

The in-focus position calculator 251 functions as first to third calculators. The in-focus position calculator 251 is capable of calculating first to third in-focus positions. The calculation of the first to third in-focus positions includes updating the first to third in-focus positions calculated in the past to calculate the first to third in-focus positions to be treated as the current first to third in-focus positions.

The reliability calculator 252 is capable of calculating reliability of a first in-focus position. The calculation of reliability includes updating the reliability calculated in the past to calculate the reliability to be treated as the current reliability.

The driver 253 is capable of moving the position (focal position) of the camera 118. The driver 253 moves the position (focal position) of the camera 118 as a user performs a manual operation of moving the position (focal position) of the camera 118 via the J/S 223 or the like. Further, the driver 253 moves the position (focal position) of the camera 118 based on control for automatically moving the position (focal position) of the camera 118, which is output from the PC 200.

The peak determining unit 254 functions as a determining unit. The peak determining unit 254 is capable of determining whether or not the contrast peak value can be calculated. In other words, the peak determining unit 254 monitors, based on the obtained object image and the position information on the object image, whether or not the condition in which the contrast peak value can be calculated is satisfied. As a result, it is possible to determine whether or not the peak value can be calculated.

The notification unit 255 is capable of outputting arbitrary notification information regarding the operation the vision measuring apparatus 300 of this embodiment. For example, the notification unit 255 outputs notification information or the like regarding reliability of the first in-focus position calculated by the reliability calculator 252. The method of outputting the notification information is not limited. For example, an arbitrary method such as displaying a predetermined GUI, outputting voice, or blinking a lamp may be used.

The mode selecting unit 256 functions as a selecting unit. The mode selecting unit 256 selects a high velocity mode and a high accuracy mode regarding autofocus (hereinafter, referred to as AF) in a switchable manner.

Those blocks execute the following information processing method of this embodiment. In other words, the software stored in the HDD 240 and the like and the hardware resources of the PC 200 cooperate and implement the information processing of the PC 200. Note that dedicated hardware may be used to implement each block such as the obtaining unit 250.

[Operation of Vision Measuring Apparatus]

Figure 3:
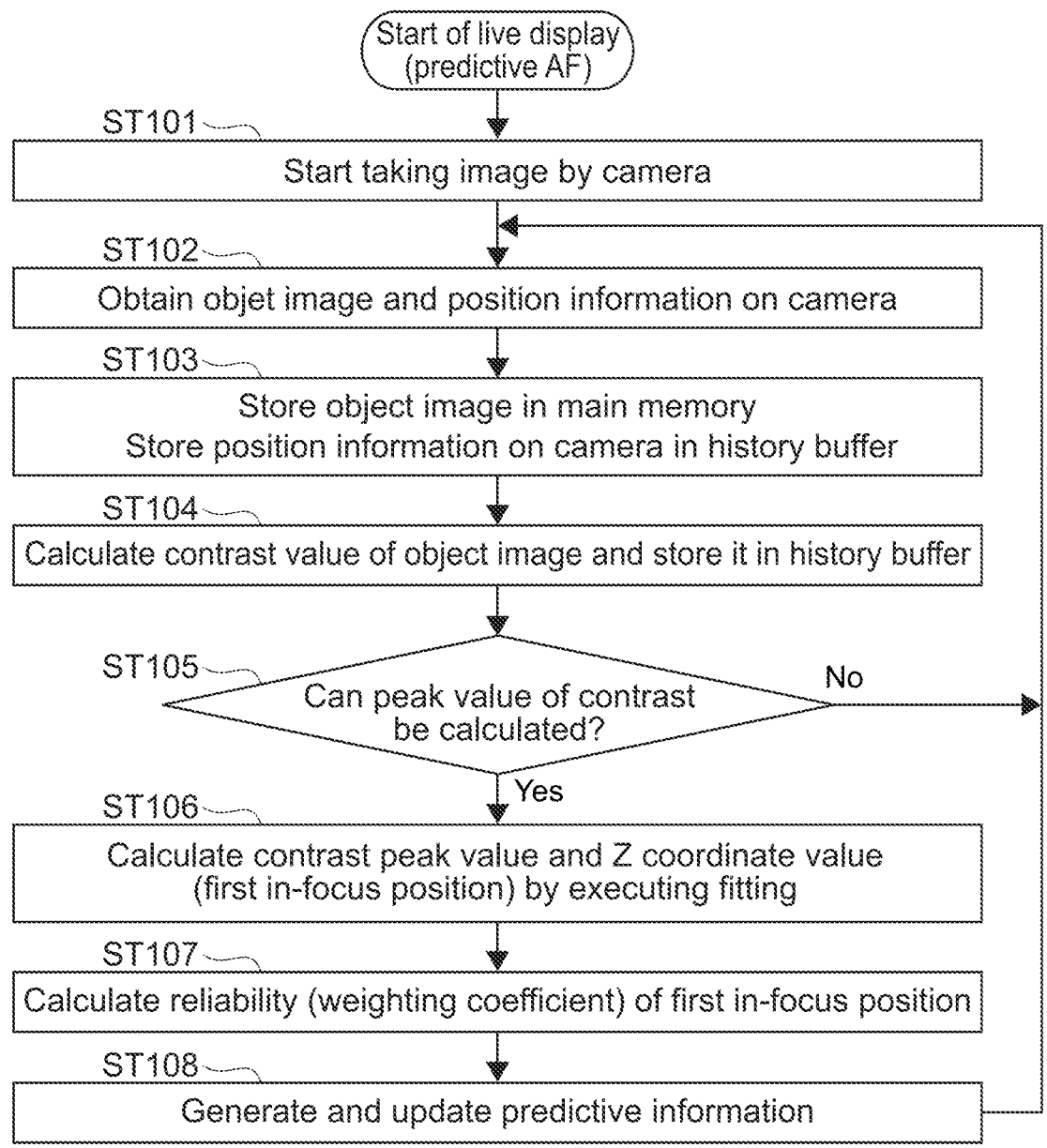
FIG. 3 is a flowchart showing an example of calculating a focus position (predictive AF)
Figure 4:
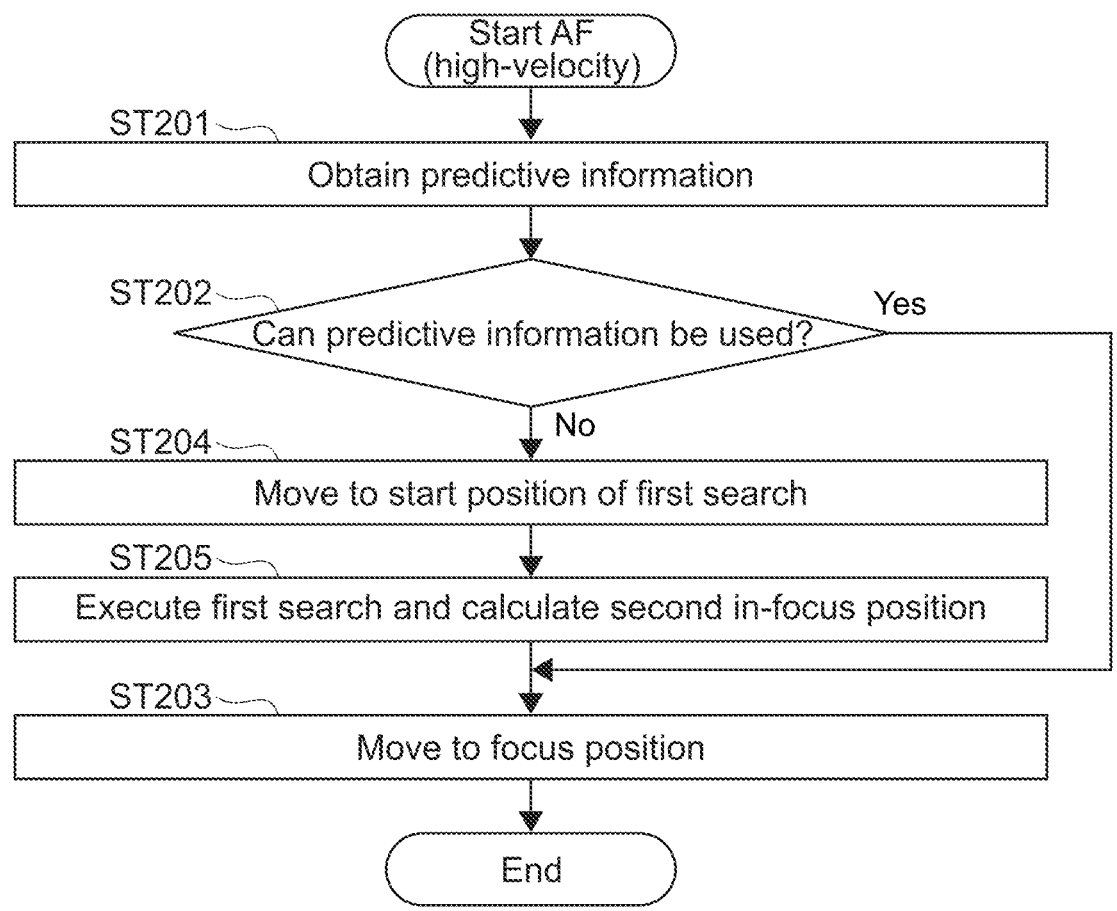
FIG. 4 is a flowchart showing an example of calculating the focus position (high-velocity-mode AF)
Figure 5:
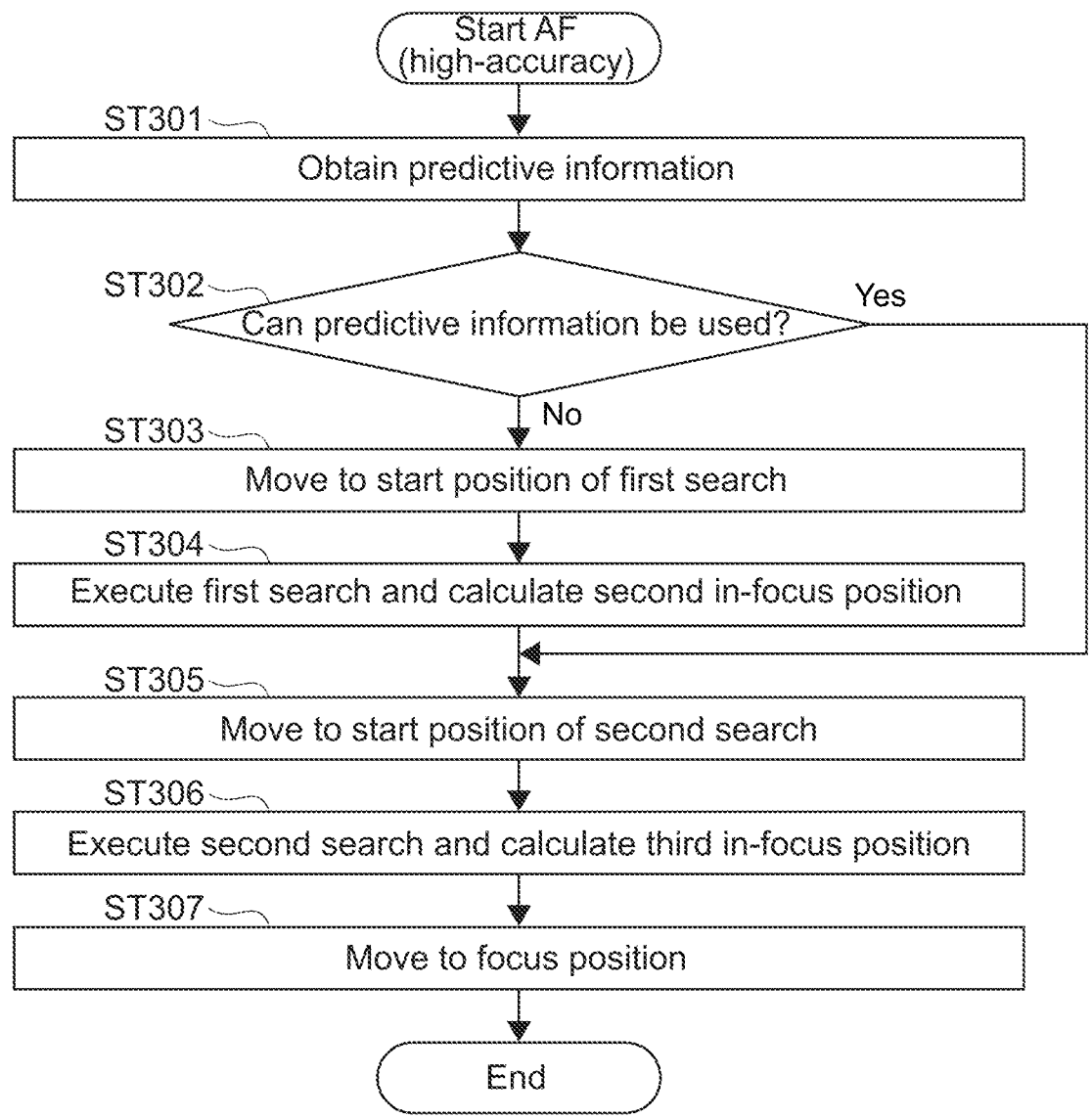
FIG. 5 is a flowchart showing an example of calculating the focus position (high-accuracy-mode AF)

An operation (calculation of focus position) of the vision measuring apparatus 300 of this embodiment will be described. FIG. 3 to FIG. 5 are each a flowchart showing an example of calculating a focus position. FIG. 6 to FIG. 12 are each a diagram illustrating each Step of FIG. 3 to FIG. 5.

In the following description, movement of the camera 118 in the Z-axis direction corresponds to movement of the focal position. Further, the movable range of the camera 118 corresponds to the movable range of the focal position.

FIG. 3 shows an example of the way to start live display in which an image of an object taken by the camera 118 is displayed on the display 225, which is a processing example before an AF instruction is input.

First, a user moves the position 121 of the camera 118 manually to the vicinity of the focus position first in order to start AF. A user checks an object image taken by the camera 118 on the display 225, and moves the camera 118 toward the focus position at the same time. For example, a GUI, an announcement, or the like urging the user to manually move the camera 118 may be output by the notification unit 255.

Figure 6:
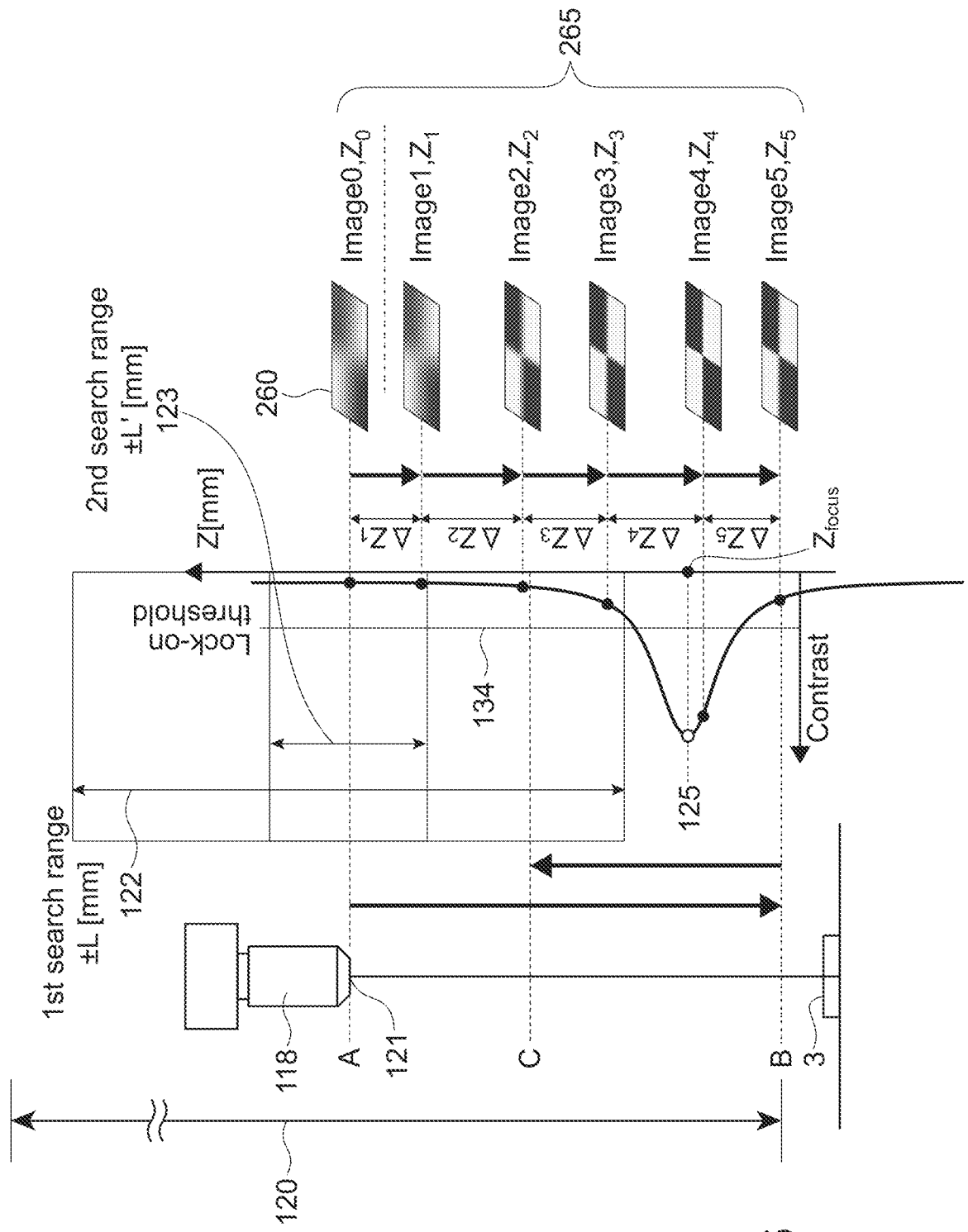
FIG. 6 is a diagram illustrating the way to manually adjust the position of a camera.

For example, as shown in FIG. 6, a focus position Z_focus is at a predetermined position in the Z-axis direction. Then, a user downward moves the camera 118 from a position A, which is above the focus position Z_focus. The user moves the camera 118 from the position A to a position B, which is below the focus position Z_focus.

At this time, the object image displayed on the display 225, which has been blurred, becomes clear and then becomes blurred again. In other words, the contrast of the object image, which has been low, becomes high and then becomes low again. As a result, a user is capable of grasping that it has passed through the focus position Z_focus. Further, the user is capable of grasping the approximate position of the focus position Z_focus.

Then the user again moves the camera 118 upward from the position B toward the focus position Z_focus. Then the user moves the camera 118 to a position C, which is above the focus position Z_focus. In this manner the position 121 of the camera 118 is manually set to the vicinity of the focus position Z_focus, and an AF instruction is input.

Note that as shown in FIG. 6, the camera 118 is configured to be movable within a predetermined range, i.e., a movable range 120. Further, in this embodiment, a first search range 122 and a second search range 123 are set with reference to the position 121 of the camera 118. The first search range 122 and the second search range 123 are ranges in which a focus position can be automatically searched at the time of executing first search and second search described later, respectively.

The first search range 122 and the second search range 123 each have a predetermined distance from the position 121 of the camera 118 in the upward direction and a predetermined distance from the position 121 of the camera 118 in the downward direction. In other words, the first search range 122 having the length ±L mm and the second search range 123 having the length ±L' mm are set, where the positive (+) direction is the upward direction along the Z axis.

The distance of the first search range 122 (length of (L mm) is larger than the distance of the second search range 123 (length of (L' mm). The distances of the first search range 122 and the second search range 123 are not limited. For example, the distances of the first search range 122 and the second search range 123 may be set arbitrarily based on the focus depth and the like. The camera 118 moves in the Z-axis direction, and as a result, the first search range 122 and the second search range 123 are moved.

Figure 7:
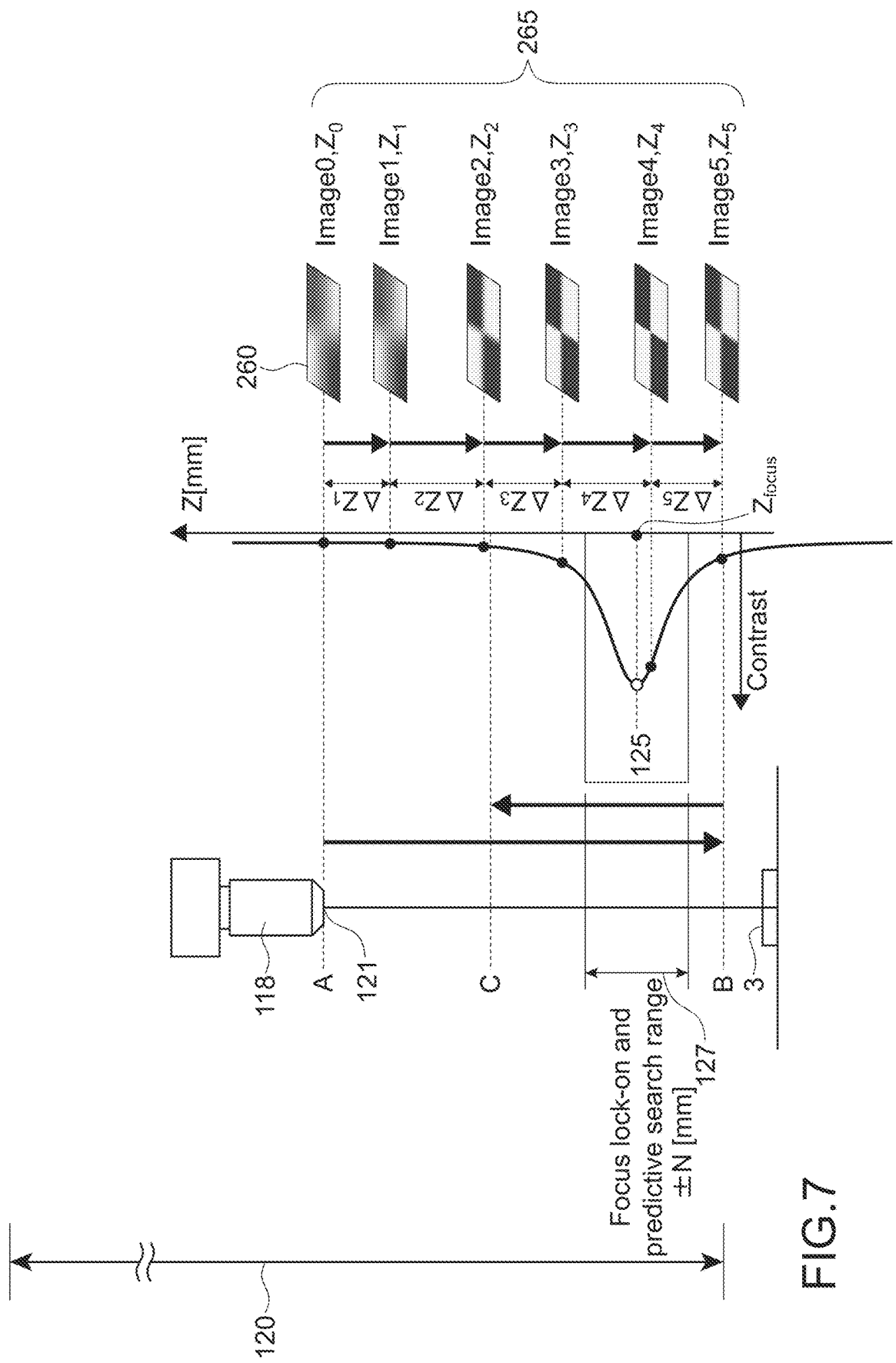
FIG. 7 is a diagram illustrating the way to set a first search range.
Figure 8:
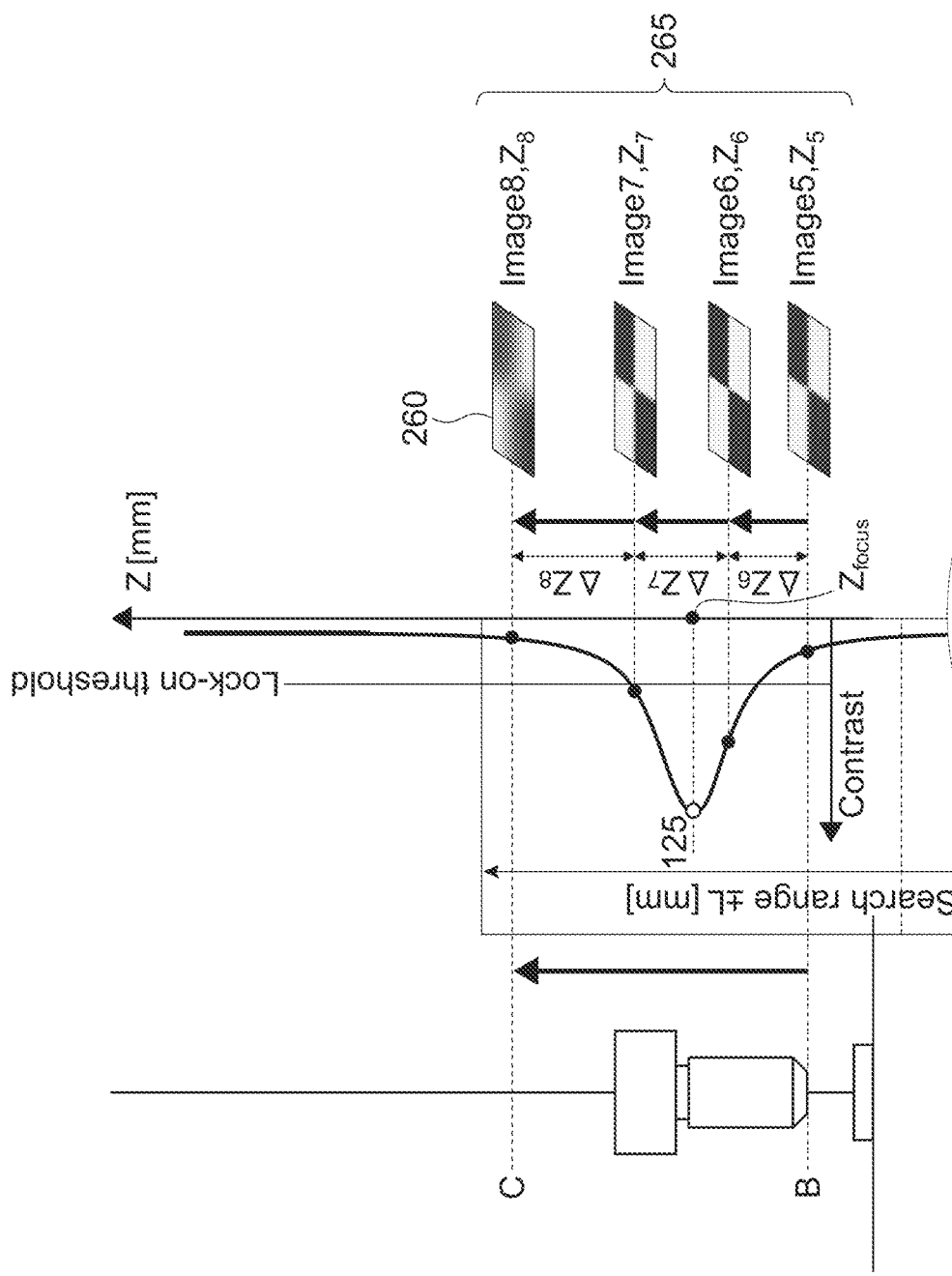
FIG. 8 is a diagram illustrating the way to manually adjust the position of the camera.

In this embodiment, when the position 121 of the camera 118 is being adjusted manually, the predictive AF shown in FIG. 3 is executed. Note that a manually-taken object image group 265 includes a plurality of object images 260 taken while manually adjusting the position 121 of the camera 118. In the examples of FIG. 6 to FIG. 8, the manually-taken object image group 265 includes the object images 260, i.e., Image0 to Image8.

As shown in FIG. 3, the camera 118 starts taking an image. The camera 118 takes an image of the work 3 at a predetermined frame rate, whereby the plurality of object images 260 are generated (Step 101). In the example of FIG. 6, the camera 118 takes the object image 260, i.e., the Image0, at the position A first.

The obtaining unit 250 obtains the object image 260, i.e., the Image0, which is taken at the position A. Further, the obtaining unit 250 obtains position information Z0 on the object image 260, i.e., the Image0. In other words, the obtaining unit 250 obtains the position information Z0 of the camera 118 (Step 102) when the object image 260, i.e., the Image® is taken.

The obtained object image 260, i.e., the Image® is stored a main memory in storage. The position information Z0 on the object image 260, i.e., the Image® is stored in a history buffer in storage (Step 103).

The in-focus position calculator 251 calculates the contrast value of the obtained object image 260, i.e., the Image0. The calculated contrast value is stored in the history buffer (Step 104).

The contrast value is an evaluated contrast value calculated based on contrast information on the object image 260. The contrast value is calculated based on brightness values of the pixels of the object image 260. The method of calculating a contrast value is not limited.

For example, a contrast value may be calculated based on the sum of the differences of the brightness values of adjacent pixels. Alternatively, a contrast value may be calculated based on the sum of the absolute values of brightness values, based on the frequency components of the object image 260, or the like. Alternatively, a contrast value may be calculated based on any arbitrary method. Note that it is not necessary to use all the pieces of information on the brightness values of all the pixels. Alternatively, some pieces of data may be used.

The peak determining unit 254 determines whether or not the peak value of contrast in the movable range 120 can be calculated (Step 105).

In this embodiment, the largest contrast value and position information on the object image 260 are read. The largest contrast value is the largest value of the contrast values of the object images 260 stored in the history buffer. Further, the lowermost end contrast value and the uppermost end contrast value are read from the history buffer. The lowermost end contrast value is a contrast value of the object images 260 in which the position information is at the lowermost end. The uppermost end contrast value is a contrast value of the object images 260 in which the position information is at the uppermost end.

The peak determining unit 254 determines whether or not the peak value of contrast can be calculated, based on the read largest contrast value, lowermost end contrast value, and uppermost end contrast value, and based on a predetermined threshold shown in FIG. 6, i.e., a lock-on threshold 134.

Specifically, the largest contrast value is larger than the lock-on threshold 134, and both the lowermost end contrast value and the uppermost end contrast value are smaller than the lock-on threshold 134. At this time, the peak determining unit 254 determines that the peak value of contrast can be calculated.

The method of determining calculation of the peak value is not limited. Another method may be used. For example, there are two object images 260 having the contrast value smaller than the lock-on threshold. Further, there is an object image 260 having the contrast value larger than the lock-on threshold, which is taken at the position between the two object images 260. In such a case, the peak determining unit 254 may determine that the peak value of contrast can be calculated. The specific value of the lock-on threshold is not limited. The specific value of the lock-on threshold may be arbitrarily set.

In the example of FIG. 6, the object image 260, i.e., the Image0 has been taken at the position A. Therefore, the flow returns to Step 102 (No in Step 105). In Step 102, the obtaining unit 250 obtains an object image 260, i.e., Image1, and position information Z1 on the object image 260, i.e., Image1.

The loop processing from Step 102 to Step 105 is repeated. The obtaining unit 250 obtains an object image 260, i.e., Image5, and position information Z5 on the object image 260, i.e., Image5. At this time, the peak determining unit 254 determines that the peak value of contrast can be calculated (Yes in Step 105). The flow proceeds to Step 106.

In Step 106, the in-focus position calculator 251 executes fitting using a predetermined function, based on pieces of contrast information on the manually-taken object image group 265. The in-focus position calculator 251 functions as a first calculator. Then, the in-focus position calculator 251 calculates a first in-focus position 125 of the camera 118 relative to the work 3 (focus lock-on).

As shown in FIG. 6, in this embodiment, based on the model function fitting, a function showing the relation between the focal position within the movable range 120 and the contrast values is calculated. Then, the peak value of the function is calculated as the contrast peak value. The position (focal position) of the camera 118, which corresponds to the contrast peak value, is calculated as the first in-focus position 125. For example, Gaussian function fitting using the method of least squares or the like may be used as the model function fitting. Alternatively, another function fitting may be used.

By executing the model function fitting, it is possible to calculate the first in-focus position 125 as the focus position Z_focus that is in focus with a high degree of accuracy.

As shown in FIG. 7, if the first in-focus position 125 is calculated and in a focus lock-on state, then a first predictive search range 127 is set with reference to the calculated first in-focus position 125. The set first predictive search range 127 is smaller than the first search range 122. The set first predictive search range 127 has predetermined distances in the upward and downward directions from the first in-focus position 125, i.e., the center. In other words, the first predictive search range 127 having the length ±N mm is set, where the positive (+) direction is the upward direction along the Z axis.

The distance of the first predictive search range 127 (length of N mm) may be set arbitrarily based on the focus depth and the like. For example if an optical system has a smaller focus depth, the smaller first predictive search range 127 is set. If an optical system has a larger focus depth, the larger first predictive search range 127 is set.

The reliability calculator 252 calculates reliability of the first in-focus position 125 (Step 107). In this embodiment, the reliability calculator 252 calculates reliability of the first in-focus position 125 based on the pieces of position information (position information Z0 to Z5) on the manually-taken object image group 265, which are obtained by repeating the loop processing from Step 102 to Step 105, and based on the contrast peak value calculated in Step 106.

In the example of FIG. 6, based on the position information Z0 to Z5 on the manually-taken object image group 265, intervals ΔZ1 to ΔZ5 between the positions of the camera 118 when the object images 260 are taken are calculated. Based on the intervals ΔZ1 to ΔZ5 between the positions of the camera 118, a moving velocity (e.g., average moving velocity) of the camera 118 when object images of the manually-taken object image group 265 are taken is calculated.

As the moving velocity of the camera 118 approaches the average moving velocity, it is determined that the reliability of the first in-focus position 125 is higher. In other words, as variation in velocity is smaller, it is determined that the reliability is higher. As variation in velocity is larger, it is determined that the reliability is lower. Further, as average moving velocity of the camera 118 increases, it is determined that the reliability of the first in-focus position 125 is lower. Note that if the average moving velocity is lower than a predetermined moving velocity, a more accurate contrast curve can be obtained, whereby it is possible to increase the reliability.

Further, the intervals ΔZ1 to ΔZ5 between the positions of the camera 118 are substantially constant, it is determined that the moving velocity of the camera 118 when objet images of the manually-taken object image group 265 are taken is kept constant, and that the reliability of the first in-focus position 125 is high. If the intervals ΔZ1 to ΔZ5 between the positions have variations, the moving velocity of the camera 118 is not stable, and it is determined that the reliability is low. The variation in the intervals ΔZ1 to ΔZ5 between the positions can be evaluated by, for example, using a standard deviation and the like.

Further, as the contrast peak value calculated in Step 106 is larger, it is determined that the reliability of the first in-focus position 125 is higher. As the contrast peak value is smaller, it is determined that the reliability of the first in-focus position 125 is lower.

As described above, in this embodiment, the reliability of the first in-focus position 125 is calculated based on the moving velocity of the camera 118 when object images of the manually-taken object image group 265 are taken, the constancy (change amount) of the velocity, and the contrast peak value. The reliability of the first in-focus position 125 is calculated as a weighting coefficient. As the reliability is higher, the weighting coefficient is larger. As the reliability is lower, the weighting coefficient is smaller. The reliability (weighting coefficient) to be calculated may be normalized such that the reliability has a value within a predetermined range such as the range from 0 to 1.

The specific method or algorithm of calculating the reliability of the first in-focus position 125 is not limited. For example, the reliability may be calculated based on one of the moving velocity of the camera 118, the constancy (change amount) of the velocity, and the contrast peak value described above, or based on an arbitrary combination thereof. Alternatively, another parameter may be used. For example, the number of contrast values or the like used in model function fitting may be used for determining the reliability.

The in-focus position calculator 251 and the reliability calculator 252 generated and update predictive information (Step 108). The predictive information is referred to in response to input of an AF instruction. The predictive information includes the first in-focus position 125 and the reliability (weighting coefficient) of the first in-focus position 125. In the example of FIG. 6, pieces of predictive information based on the manually-taken object image group 265, i.e., Image0 to Image5 are generated.

Note that the predictive information also includes the contrast values on the object images 260 and pieces of position information on the object images 260 stored in the history buffer. In addition, arbitrary information may be generated as the predictive information.

As shown in FIG. 8, the camera 118 is moved manually from the position B toward the position C. Also at this time, the predictive AF shown in FIG. 3 is executed. The manually-taken object image group 265, i.e., Image6 to Image8, and position information Z6 to Z8 on the Image6 to Image8 are sequentially obtained, and the contrast values of the object images 260 are calculated (loop processing from Step 102 to 105).

When the object image 260, i.e., Image8 taken at the position C and the position information Z8 are obtained, it is determined that the contrast peak value can be calculated (Yes in Step 105). Note that in the determination Step, the largest contrast value, the lowermost end contrast value, and the uppermost end contrast value are read for, for example, the object image 260, i.e., Image5 obtained finally by the previous calculation of the first in-focus position 125 and subsequent object images. Specifically, these values are read for the manually-taken object image group 265, i.e., Image5 to Image8.

By executing the model function fitting, the contrast peak value and the first in-focus position 125 are calculated (Step 106). The reliability (weighting coefficient) of the first in-focus position 125 is calculated (Step 107). As described above, in this embodiment, the first in-focus position 125 is calculated every time it is determined in Step 105 that the contrast peak value can be calculated.

The in-focus position calculator 251 and the reliability calculator 252 update the predictive information (Step 108). In this embodiment, the first in-focus position 125 and the reliability (weighting coefficient) of the first in-focus position 125 are updated based on the following formulae.

$$Zfocus\_c = (Zfocus\_p \times Wpast + Zfocus\_n \times Wnew) / (Wpast + Wnew)$$

$$Wcurrent = Wpast + Wnew$$

The parameters in the formulae are as follows.
Zfocus_c . . . Updated first in-focus position
Zfocus_p . . . Previously-updated first in-focus position
Zfocus_n . . . Newly-calculated first in-focus position
Wcurren . . . Updated reliability
Wpast . . . Previously-updated reliability
Wnew . . . Newly-calculated reliability As described above, in this embodiment, the in-focus position calculator 251 updates a first in-focus position (Zfocus_p) included in the predictive information based on the first in-focus position 125 calculated in the past and the reliability of the first in-focus position 125 calculated in the past. The in-focus position calculator 251 calculates a first in-focus position (Zfocus_c) based on the first in-focus position (Zfocus_p). The in-focus position calculator 251 functions as a first calculator. As a matter of course, also a first in-focus position (Zfocus_n) newly calculated by executing fitting using a model function is used.

The process of calculating the first in-focus position 125 by executing fitting using a predetermined function based on the pieces of contrast information on the manually-taken object image group 265 includes updating the first in-focus position (Zfocus_p) included in the predictive information to calculate the current first in-focus position (Zfocus_c). In other words, by arbitrarily executing both fitting and updating, the first in-focus position 125 of the camera 118 relative to the work 3 is calculated.

The first in-focus position 125 having high reliability is calculated by weighting the current first in-focus position 125 based on the reliability of the first in-focus position 125 calculated in the past to calculate the current first in-focus position 125. In other words, it is possible to improve the accuracy of detecting the focus position Z_focus.

Further, the reliability calculator 252 updates a reliability (Wpast) included in the predictive information based on the reliability of the first in-focus position 125 calculated in the past to calculate an updated reliability (Wcurren) of the first in-focus position 125. As a matter of course, also a newly-calculated reliability (Wnew) of the first in-focus position 125 is used. Note that the method of updating the predictive information is not limited. A calculation method different from the above-mentioned formula may be arbitrarily used.

FIG. 4 and FIG. 5 are each a flowchart showing an example of AF process executed when an AF instruction is input by a user. FIG. 4 shows an example of processing when a high velocity mode is selected as an AF mode. The high velocity mode is a mode to be selected for observing the work 3. In this embodiment, the high velocity mode corresponds to a normal mode.

FIG. 5 shows an example of processing when a high accuracy mode is selected as an AF mode. The high accuracy mode is a mode selected for observing the work 3. With the high accuracy mode, AF with a higher accuracy than that in the case of the high velocity mode is realized.

The high velocity mode and the high accuracy mode are arbitrarily selected by the mode selecting unit 256 shown in FIG. 2 as a user inputs such an instruction or the PC 200 perform such setting. For example, the notification unit 255 may output which mode is being selected via a GUI, an announcement, or the like.

As shown in FIG. 4, if the high velocity mode is being selected, the driver 253 obtains predictive information (Step 201). Whether or not the obtained predictive information can be used is determined (Step 202). In this embodiment, whether or not the reliability of the first in-focus position 125 included in the predictive information has a value larger than a predetermined threshold is determined. In other words, whether or not the updated reliability (Wcurren) of the first in-focus position (Zfocus_c) described above has a value larger than the predetermined threshold is determined. The predetermined threshold may be set arbitrarily.

Figure 9:
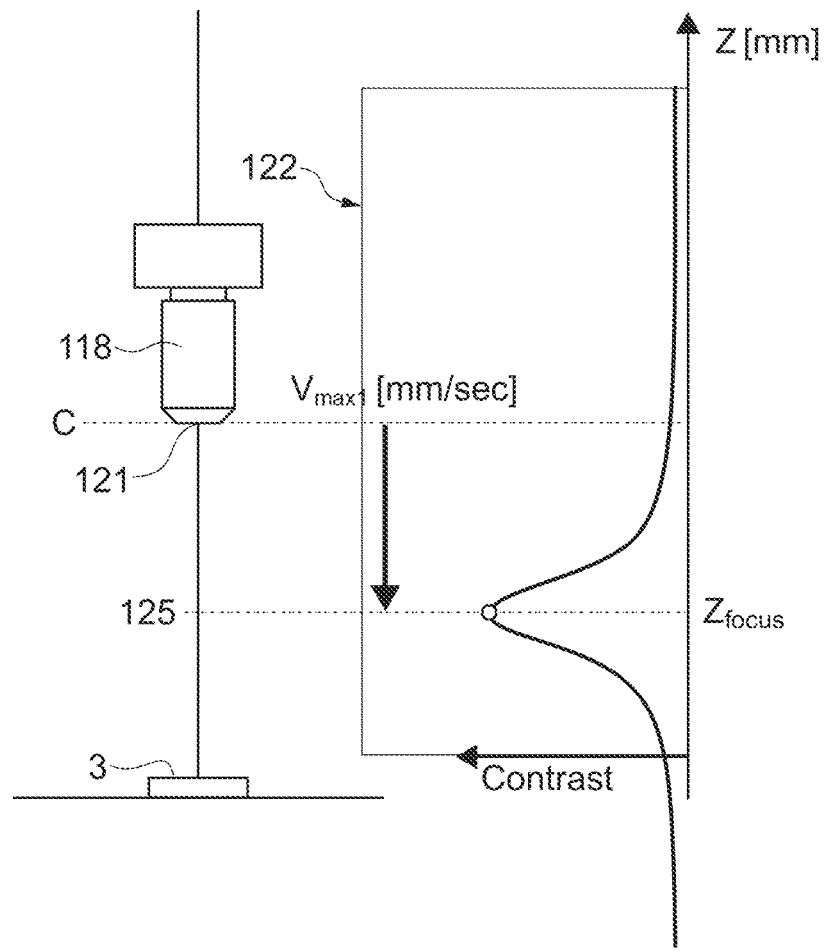
FIG. 9 is a diagram illustrating an operation of moving the camera in the high-velocity-mode AF.

If the updated reliability (Wcurren) of the first in-focus position (Zfocus_c) has a value larger than the predetermined threshold, the position (focal position) of the camera 118 is moved to the first in-focus position 125 as shown in FIG. 9. In other words, the camera 118 moves to the first in-focus position (Zfocus_c) as the focus position Z_focus (Step 203). As a result, since a search operation is not performed and AF is finished, it is possible to significantly reduce the time of AF.

Further, since it only needs to move the camera 118 at a sufficiently high velocity, e.g., a first velocity Vmax1, which is the maximum velocity, the time of AF is very short.

If the updated reliability (Wcurren) of the first in-focus position (Zfocus_c) has a value smaller than the predetermined threshold, first search is executed instead of using the first in-focus position 125 as the focus position Z_focus. The first search is executed within the first predictive search range 127 with reference to the first in-focus position 125.

Therefore, the position of the camera 118 is moved to one of end points of the first predictive search range 127 as the starting position of the first search (Step 204). Typically, the position of the camera 118 is moved to the end point closer to the position of the camera 118 when an AF instruction is input. As a result, it is possible to reduce the time of AF.

The first search is executed. The in-focus position calculator 251 calculates a second in-focus position of the camera 118 relative to the work 3 (Step 205). The in-focus position calculator 251 functions as a second calculator.

Figure 10:
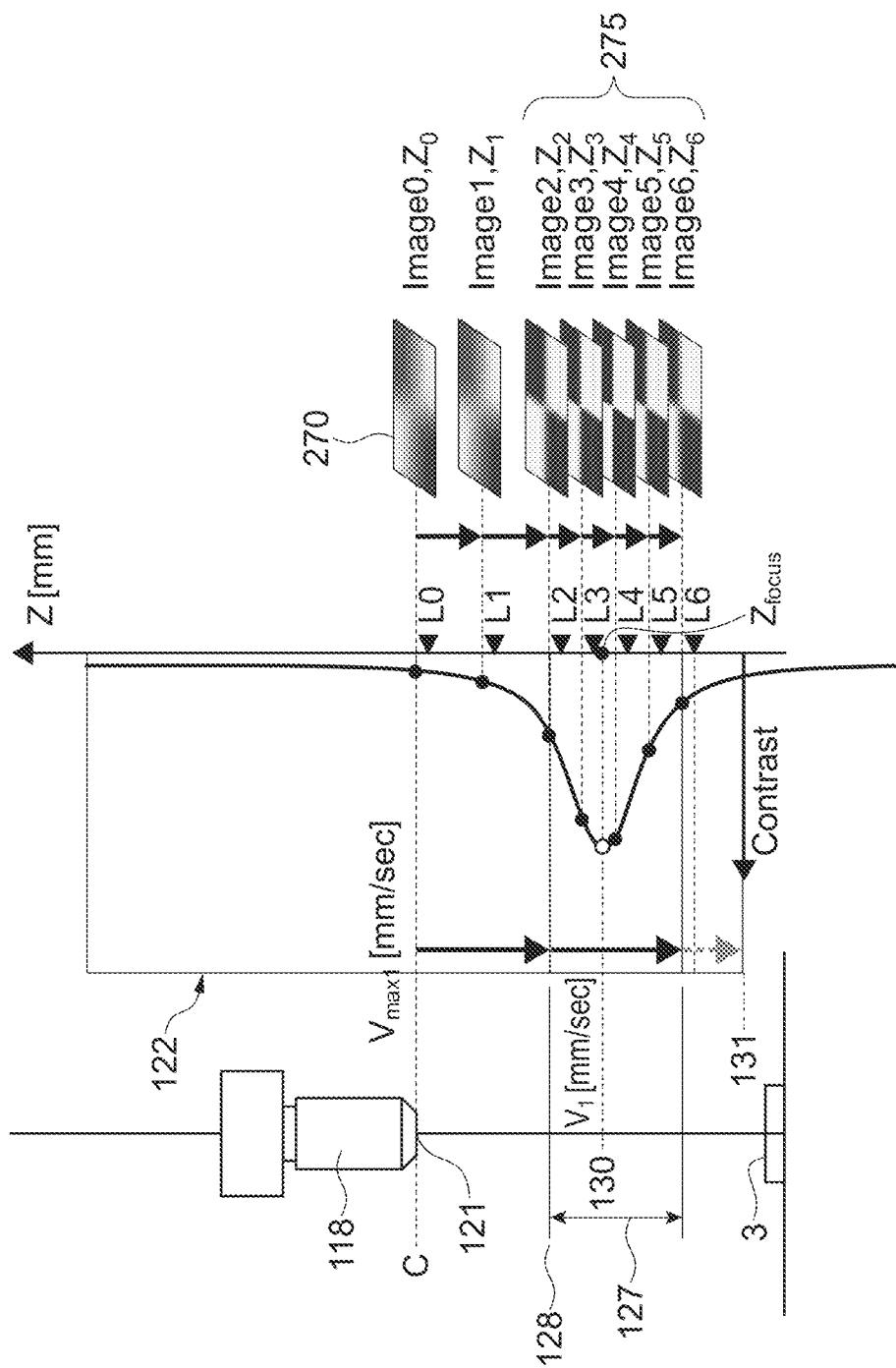
FIG. 10 is a diagram illustrating an operation of moving the camera in the high-velocity-mode AF.

For example, as shown in FIG. 10, the driver 253 moves the position of the camera 118 within the first predictive search range 127 at a second velocity V1 lower than the first velocity Vmax1. The specific value of the second velocity V1 is not limited. The specific value of the second velocity V1 may be set arbitrarily based on the focus depth or the like so that it is possible to calculate the focus position Z_focus with a high degree of accuracy.

The camera 118 takes images of the work 3 while moving the position of the camera 118 automatically within the first predictive search range 127 to generate a plurality of object images 270. An automatically-taken object image group 275 includes the plurality of object images 270. In the example of FIG. 10, the automatically-taken object image group 275 includes the object images 270 (Image2 to Image6). Note that the object images 270 (Image0 and Image1) may be used to calculate a second in-focus position 130.

The in-focus position calculator 251 calculates the second in-focus position 130 in the first predictive search range 127 based on the pieces of contrast information on the automatically-taken object image group 275. In other words, the contrast peak value is calculated based on the pieces of contrast information on the automatically-taken object image group 275. Then, the position of the camera 118 corresponding to the contrast peak value is calculated as the second in-focus position 130. The second in-focus position 130 is calculated as the focus position Z_focus.

Typically, the second in-focus position 130 is calculated by executing fitting using a predetermined function based on the pieces of contrast information on the automatically-taken object image group 275. For example, Gaussian function fitting using the method of least squares or the like may be used as the model function fitting. Alternatively, another function fitting may be used. In addition, as the method of calculating the contrast value and the peak value, an arbitrary method may be used.

In the example of FIG. 10, the contrast peak value is calculated when the object image 270 (Image6) is taken at the end point of the first predictive search range 127. Then, movement of the camera 118 is stopped when the object image 270 (Image6) is taken. Note that movement of the camera 118 may be stopped when the peak value is calculated before moving to the lowermost end of the first predictive search range 127. As a result it is possible to reduce the processing time. For example, movement of the camera 118 is stopped when contrast values are calculated, where the number of the contrast values is enough to calculate a parameter of a model function.

The driver 253 moves the position (focal position) of the camera 118 to the second in-focus position 130. In other words, the camera 118 moves to the second in-focus position 130 as the focus position Z_focus (Step 203). By executing the first search on the first predictive search range 127 with reference to the first in-focus position 125 in this way, it is possible to sufficiently prevent needless scanning from occurring. It is also possible to calculate the focus position Z_focus at a high velocity.

Note that the first predictive search range 127 with reference to the first in-focus position 125 may not be the range having a predetermined length including the first in-focus position 125 at the center. Alternatively, the range between a starting position 128 of the first predictive search range 127 and the end point (lowermost end 131 in example of FIG. 10) of the first search range 122 at the opposite side may be set as the first predictive search range 127. As a result, it is possible to scan a wider range, and to calculate the focus position Z_focus with a high degree of accuracy.

The case where the high accuracy mode is selected will be described with reference to FIG. 5. Steps 301 to 304 shown in FIG. 5 are similar to Steps 201, 202, 204, and 205 shown in FIG. 4. If the updated reliability (Wcurren) of the first in-focus position (Zfocus_c) included in the predictive information has a value larger than a predetermined threshold (Yes in Step 302), second search is executed by using the first in-focus position (Zfocus_c) as a search reference position.

If the updated reliability (Wcurren) of the first in-focus position (Zfocus_c) information has a value smaller than a predetermined threshold (No in Step 302), the first search is executed to calculate the second in-focus position 130 (Step 303 and 304). The second search is executed by using the calculated second in-focus position 130 as a search reference position.

Figure 11:
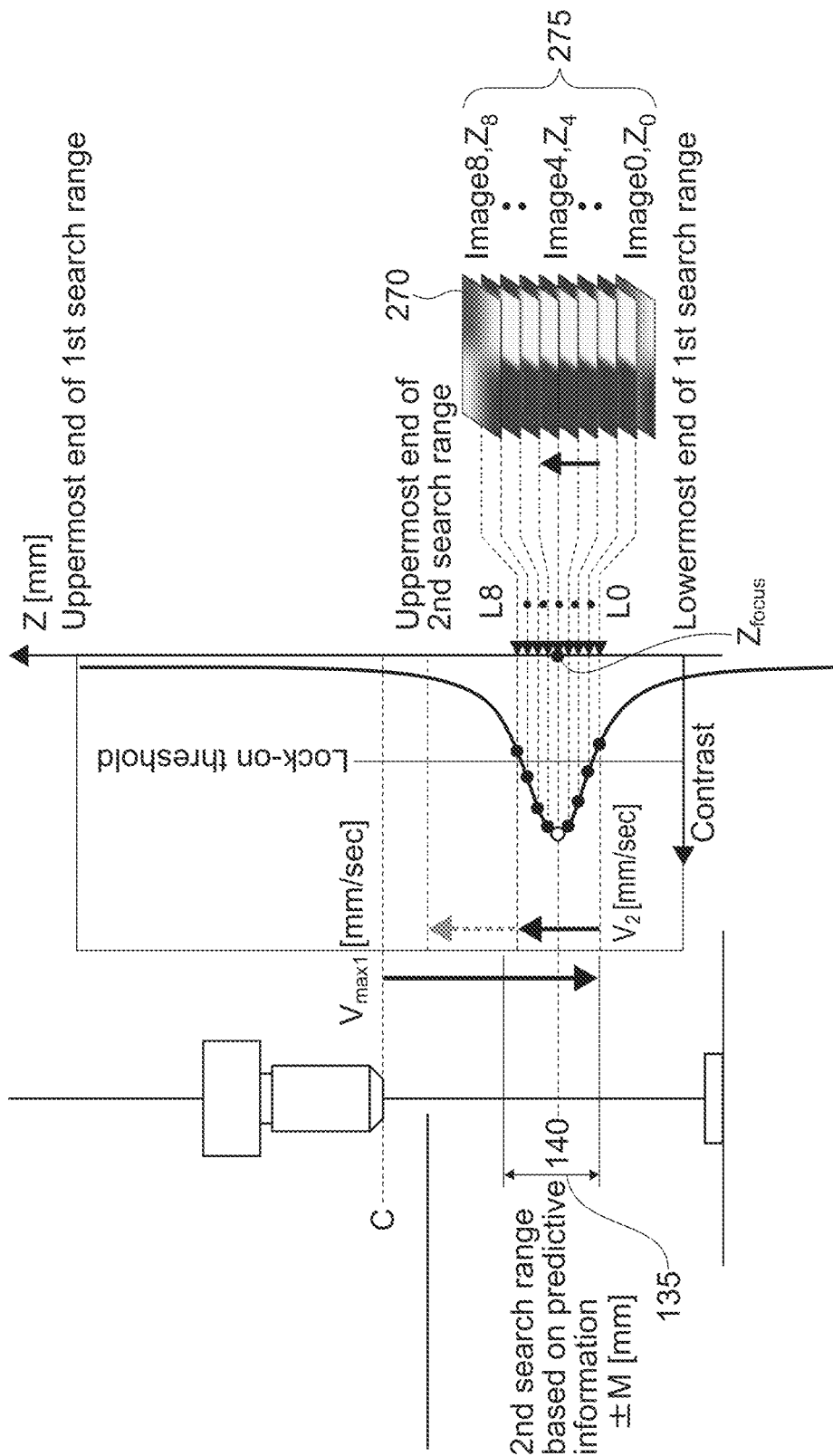
FIG. 11 is a diagram illustrating an operation of moving the camera in the high-accuracy-mode AF.

As shown in FIG. 11, a second predictive search range 135 based on the search reference position is set. The set second predictive search range 135 is smaller than the second search range 123. The set second predictive search range 135 has predetermined distances in the upward and downward directions from the search reference position (the first in-focus position or the second in-focus position), i.e., the center. The distance of the second predictive search range 135 (length of M mm) may be set arbitrarily based on the focus depth and the like.

The position of the camera 118 is moved to one of end points of the second predictive search range 135 as the starting position of the second search (Step 305). In the example of FIG. 11, the position of the camera 118 is moved to the lowermost end of the second predictive search range 135. As a matter of course, the end point closer to the current position of the camera 118 may be selected as the starting position of the second search.

The second search is executed. The in-focus position calculator 251 calculates a third in-focus position 140 of the camera 118 relative to the work 3 (Step 306). The in-focus position calculator 251 functions as a third calculator. For example, as shown in FIG. 11, the driver 253 moves the position of the camera 118 within the second predictive search range 135 at a third velocity V2 lower than the second velocity V1. The specific value of the third velocity V2 is not limited. The specific value of the third velocity V2 may be set arbitrarily based on the focus depth or the like so that it is possible to calculate the focus position Z_focus with a high degree of accuracy higher than that in the case of the first search.

The camera 118 takes images of the work 3 within the second predictive search range 135 while automatically moving the position of the camera 118 to generate the plurality of object images 270. The automatically-taken object image group 275 includes the plurality of object images 270. In the example of FIG. 11, the automatically-taken object image group 275 includes the object images 270, i.e., Image0 to Image8.

The in-focus position calculator 251 calculates the third in-focus position 140 within the second predictive search range 135 based on the pieces of contrast information on the automatically-taken object image group 275. In other words, the contrast peak value is calculated based on the pieces of contrast information on the automatically-taken object image group 275. Then, the position of the camera 118 corresponding to the contrast peak value is calculated as the third in-focus position 140. The third in-focus position 140 is calculated as the focus position Z_focus in the high accuracy mode.

Typically, the third in-focus position 140 is calculated by executing fitting using a predetermined function based on the pieces of contrast information on the automatically-taken object image group 275. For example, Gaussian function fitting using the method of least squares or the like may be used as the model function fitting. Alternatively, another function fitting may be used. In addition, as the method of calculating the contrast value and the peak value, an arbitrary method may be used.

In the example of FIG. 11, movement of the camera 118 is stopped when the peak value is calculated before moving to the uppermost end of the second predictive search range 135. As a result, it is possible to reduce the processing time. Meanwhile, the camera 118 may move to the uppermost end of the second predictive search range 135 or to the uppermost end of the second search range shown in FIG. 11. As a result, it is possible to scan a wider range, and to calculate the focus position Z_focus with a high degree of accuracy. The movable range of the camera 118 may be set arbitrarily based on, for example, whether or not contrast values are calculated, where the number of the contrast values is enough to calculate a parameter of a model function.

The driver 253 moves the position (focal position) of the camera 118 to the third in-focus position 140. In other words, the camera 118 moves to the third in-focus position 140 as the focus position Z_focus (Step 307). By executing the second search with reference to the focus position Z_focus calculated with the high velocity mode in this way, it is possible to calculate the focus position Z_focus for measurement with a high degree of accuracy.

For example, the work 3 is replaced or displaced after the position of the camera 118 is adjusted manually and before an AF instruction is input. Alternatively, an image pickup condition is changed (e.g., lighting intensity is changed). In this case, the focus position Z_focus is changed. As a result, it is difficult to properly move the position of the camera 118 to the focus position Z_focus by the processing shown in FIG. 4 and FIG. 5. In other words, AF is likely to be performed unsuccessfully.

In this embodiment, if an AF instruction is not input within a predetermined period after the first in-focus position 125 is calculated, then the reliability calculator 252 determines that the first in-focus position 125 is invalid such that AF may be performed successfully.

The focus position Z_focus is changed because the work 3 is replaced or the like after the first in-focus position 125 is calculated in most cases. It is believed that a user inputs an AF instruction soon after he/she adjusts the position of the camera 118 manually if the work 3 is not to be replaced or the like.

In consideration of this, if a predetermined time period passes after the first in-focus position 125 is calculated, then it is determined that the work 3 is likely to be replaced or the like. In this case, it is determined that the first in-focus position 125 is invalid. As a result, it is possible to prevent needless search from occurring. Note that a predetermined time period may be set as necessary.

Figure 12:
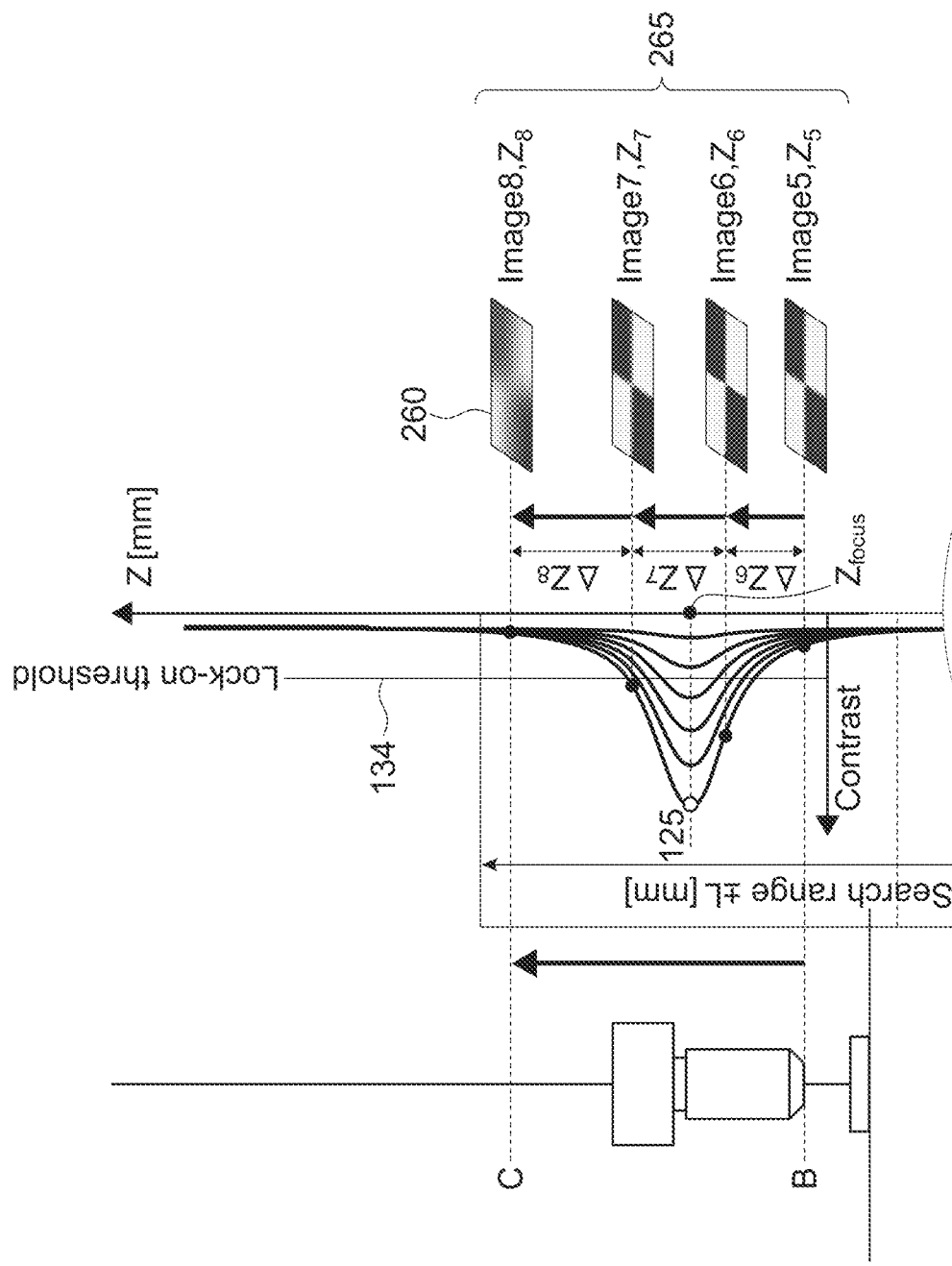
FIG. 12 is a diagram illustrating an example of a method of determining validity of a first in-focus position.

The predetermined time period may be set based on the contrast peak value as shown in FIG. 12. Specifically, the contrast peak value is attenuated at a predetermined rate. The attenuated peak value falls below the lock-on threshold 134. At this time, it is determined that the first in-focus position 125 is invalid.

In other words, in the example of FIG. 12, a time period until the peak value falls below the lock-on threshold 134 is set as the predetermined time period. A predetermined rate and the lock-on threshold 134 may be set as necessary. For example, the predetermined rate may be the frame rate or the like.

After the first in-focus position 125 is invalid, such a fact is notified via, for example, a GUI, an announcement, or the like, which urges the user to manually adjust the position of the camera 118 again. Then, the predictive F shown in FIG. 3 is executed again.

Note that even if the focus position Z_focus is changed before an AF instruction is input, AF may be continued to calculate the focus position Z_focus. For example, it is determined in Step 202 in FIG. 4 that the updated reliability (Wcurren) of the first in-focus position (Zfocus_c) has a value larger than the predetermined threshold, and the position of the camera 118 is moved to the first in-focus position 125 in Step 203.

Whether or not AF has been properly executed is determined based on the contrast value of the object image taken at the position. For example, if the contrast value of the object image taken at the first in-focus position 125 is smaller than a predetermined threshold, it is determined that AF is unsuccessful. Then, by searching the entire first search range 122 with reference to the first in-focus position 125, the contrast peak value is calculated. The position (focal position) of the camera 118 corresponding to the calculated contrast peak value is calculated as the focus position Z_focus.

If the entire first search range 122 with reference to the first in-focus position 125 is searched and the contrast peak value is not calculated, the position of the camera 118 is arbitrarily moved within the movable range 120. By searching the entire first search range 122 with reference to the position after the movement, it is possible to calculate the focus position Z_focus.

For example, it is determined in Step 202 in FIG. 4 that the updated reliability (Wcurren) of the first in-focus position (Zfocus_c) has a value smaller than the predetermined threshold and the first search is executed in Step 204 and 205. If the contrast peak value is not calculated within the first predictive search range 127, another range within the first search range 122 is searched to calculate the contrast peak value. The position (focal position) of the camera 118 corresponding to the calculated contrast peak value is calculated as the focus position Z_focus.

If the entire first search range 122 is searched and the contrast peak value is not calculated, it only needs to move the position of the camera 118 arbitrarily and search the entire first search range 122 with reference to the position after the movement.

If the high accuracy mode is selected, it only needs to execute the second search by using the contrast peak value calculated by searching the entire first search range 122 as the search reference position. Note that a user rarely replaces a work and inputs an AF instruction after he/she adjusts the position of the camera 118 manually. So, the above-mentioned case is very rare.

The first in-focus position 125 is calculated based on the pieces of contrast information on the manually-taken object image group 265. Next, an example of the way to calculate the first in-focus position 125 will be described in detail. FIG. 13 and FIG. 14 are pictures and diagrams schematically illustrating the example of calculating the first in-focus position 125.

Figure 13A:
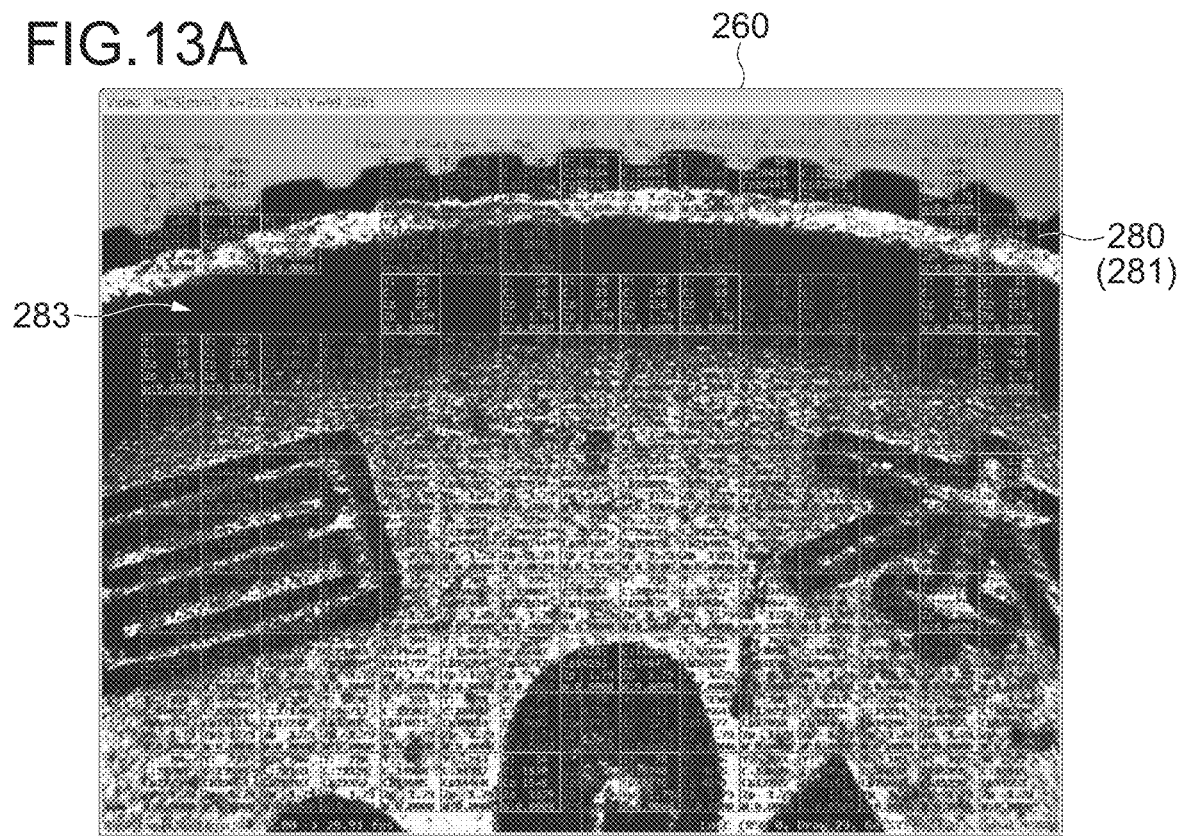
FIGS. 13A and 13B are a photograph and a diagram schematically illustrating the way to calculate first in-focus positions based on pieces of contrast information on a manually-taken object image group.
Figure 13B:
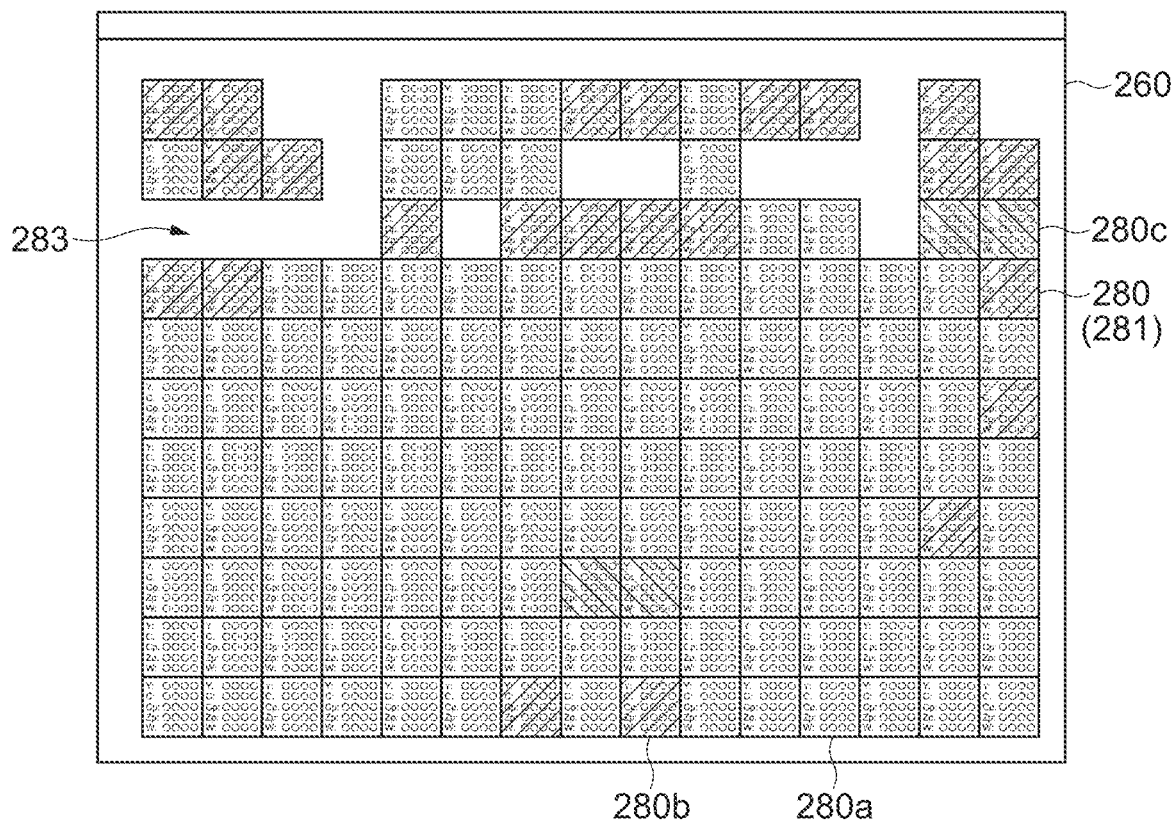
Figure 14A:
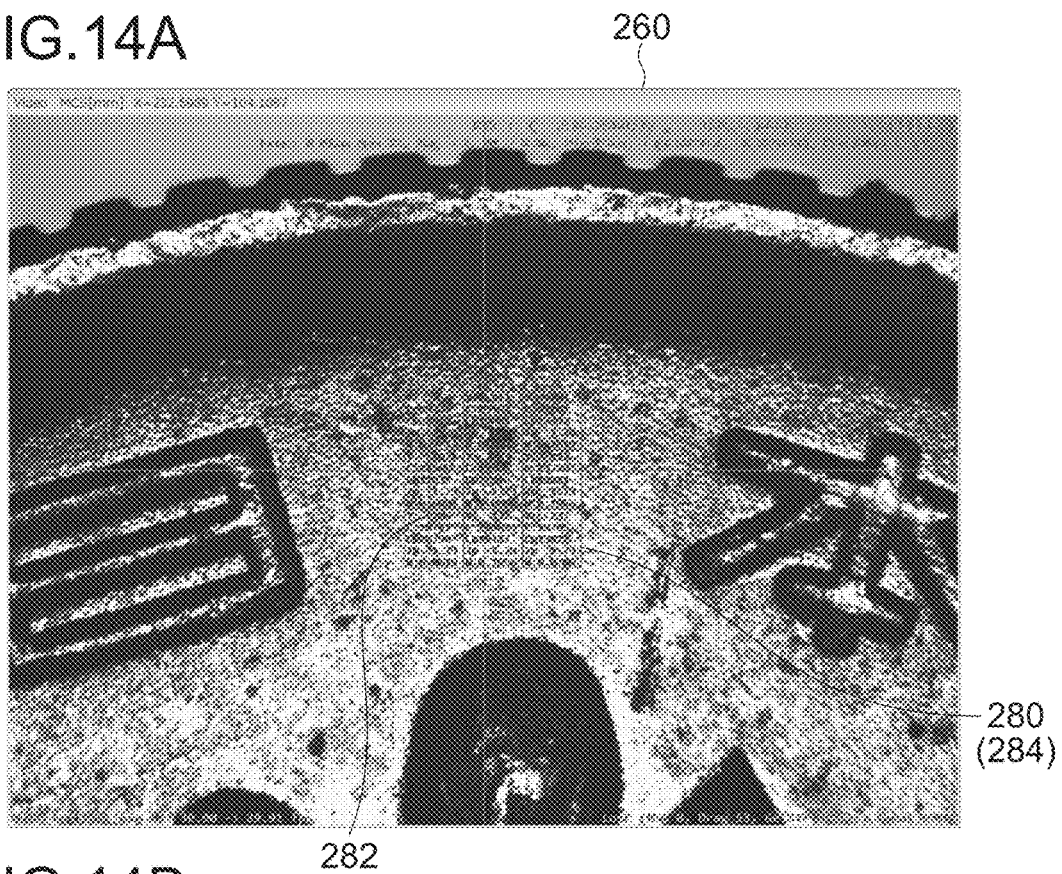
FIGS. 14A and 14B are a photograph and a diagram schematically illustrating the way to calculate first in-focus positions based on pieces of contrast information on a manually-taken object image group.
Figure 14B:
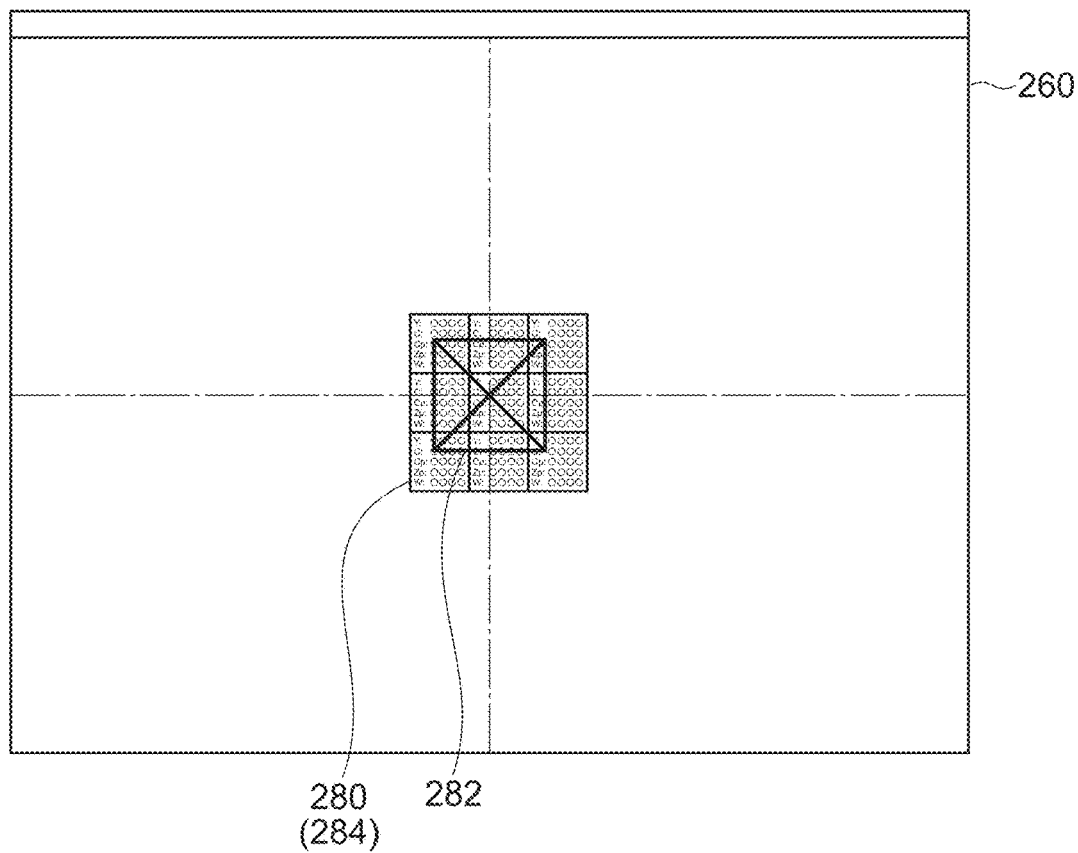

As shown in the photograph of FIG. 13A and the diagram of FIG. 13B, in this embodiment, the object image 260 is divided, and a plurality of divided areas 280 are set. Divided-area in-focus positions and reliability of the divided-area in-focus positions are calculated based on the pieces of contrast information on the plurality of divided areas 280 by applying an algorithm similar to the calculation of the first in-focus position illustrated in FIG. 3 for each divided area 280.

Then, predictive information is generated and updated for each divided area 280, and stored in storage. The predictive information includes divided-area in-focus positions and reliability of the divided-area in-focus positions. The predictive information also includes the contrast value for each divided area stored in the history buffer and position information on the divided area. The position information on the divided area corresponds to the position information on the object images 260 including the divided area.

Predictive information (hereinafter, referred to as divided-area information) stored for each divided area 280 is used as necessary to calculate the first in-focus position 125 and reliability (weighting coefficient) of the first in-focus position 125 of the entire object image 260.

For example, in the example of FIG. 13, divided-area information is displayed in a cell 281 showing each divided area 280. The cell 281 shows the following pieces of information.

Y . . . Brightness of the divided area 280 when the camera is at the current Z position (focal position) (average value of brightness of all pixels of divided area 280. Represented by 256 tones/8 bits, for example).

C . . . Contrast value of the divided area 280 when the camera is at the current Z position (focal position).

Cp . . . Largest contrast value of the divided area 280 until now.

Zp . . . Z position (focal position) of the camera when the camera takes an image including the divided area 280 having the largest contrast value Cp. The value Zc in the formula is used.

W . . . Weighting coefficient (described later) determined based on the size of an area overlapping with a reference area 282 of FIG. 10.

For example, those pieces of information are stored as divided-area information. Alternatively, other pieces of information may be stored as divided-area information.

In FIG. 13, no cell 281, which shows the divided area 280, is displayed on areas 283. It is not possible to calculate the above-mentioned divided-area information for the areas 283. For example, the divided-area in-focus positions in Steps 106 and 107 shown in FIG. 3, and the area whose reliability is not yet calculated correspond to such areas.

Red cells are displayed in FIG. 13A for the divided areas 280a of FIG. 13B without hatching. The divided-area in-focus position and the reliability of each divided area 280a have been confirmed.

Yellow cells are displayed in FIG. 13A for diagonally-right-up-hatched divided areas 280b of FIG. 13B. It is determined that the divided-area in-focus position of each divided area 280b is not above the current Z position. Meanwhile, it is determined that the divided-area in-focus position of each divided area 280b may be below the current Z position. In other words, the divided-area in-focus position of each divided area 280b is yet to be determined.

Blue cells are displayed in FIG. 13A for diagonally-left-up-hatched divided areas 280c of FIG. 13B. It is determined that the divided-area in-focus position of each divided area 280c is not below the current Z position. Meanwhile, it is determined that the divided-area in-focus position of each divided area 280c may be above the current Z position. In other words, the divided-area in-focus position of each divided area 280c is yet to be determined.

The divided-area in-focus position of each red cell (divided area 280a) and the reliability (weighting coefficient) of the divided-area in-focus position are determined. Information on the red cells (divided areas 280a) is used to calculate the first in-focus position 125 of the entire object image 260, and the reliability (weighting coefficient) of the first in-focus position 125. Note that the colors are not limited to the above colors.

As shown in FIG. 14, in order to calculate the first in-focus position 125 of the entire object image 260, and the reliability (weighting coefficient) of the first in-focus position 125, a reference area 282 is set in the object image 260. The first in-focus position 125 is to be calculated with reference to the reference area 282. Typically, the set reference area 282 is at the center of the object image 260, and has a predetermined size. The position of the reference area 282 is not limited to the center. Alternatively, the set reference area 282 may be at an arbitrary position in the camera view, and the reference area 282 may have an arbitrary size.

The divided areas 280 overlapping with the reference area 282 are set as calculation-object areas 284. The first in-focus position 125 of the entire object image 260 and the reliability (weighting coefficient) of the first in-focus position 125 are calculated based on the pieces of divided-area information on the calculation-object areas 284, each of which includes information on the divided-area in-focus position and the reliability (weighting coefficient) of the divided-area in-focus position.

At this time, the calculation-object areas 284 are weighted based on the sizes of areas overlapping with the reference area 282. As a result, it is possible to calculate the first in-focus position 125 and the reliability of the first in-focus position 125 with a high degree of accuracy.

If the reference area 282 contains an entire cell, i.e., a calculation-object area 284, the weighting coefficient W of the cell is 1.0. If the reference area 282 contains part of a cell, W of the cell is a value between 0.0 and 1.0. If a cell is out of the reference area 282, W of the cell is 0.0. This cell is a divided area 280 other than the calculation-object areas 284. W may be displayed for debugging miscalculation of a weighting coefficient.

For example, the divided-area in-focus position of each calculation-object area 284 is multiplied by the weighting coefficient W and the obtained values are summed up to calculate the first in-focus position 125 of the entire object image 260. Further, each divided-area in-focus position is multiplied by the weighting coefficient W and the obtained values are summed up to calculate the first in-focus position 125 of the entire object image 260 and the reliability (weighting coefficient) of the first in-focus position 125. As a matter of course, the method of weighting is not limited, and an arbitrary method may be used (specific calculation example will be described later with reference to FIG. 20).

In FIG. 13 and FIG. 14, the divided areas 280 and the pieces of divided-area information are information for internal processing. In other words, the cells showing the divided areas 280 and the pieces of divided-area information are not in fact displayed on the display 225. A user confirms an image, which shows no cells and no divided-area information, displayed on the display 225. As a matter of course, those pieces of information may be displayed on the display 225 when a user operates the vision measuring apparatus 300. However, those pieces of information are used for debugging typically.

FIG. 15 is a diagram illustrating the way to set the plurality of divided areas 280. As shown in FIG. 15, a machine coordinate system and a contrast-map coordinate system are stored in storage. The machine coordinate system shows the position of the stage 112 and the position of the image pickup unit 114. The coordinate of an image pickup position 285 is calculated based on the machine coordinate system. The machine coordinate system is set within a range including the movable range of the image pickup position 285. The coordinate of the machine coordinate system is represented in millimeters.

The origin, the X axis, and the Y axis of the machine coordinate system are same as the origin, the X axis, and the Y axis of the contrast-map coordinate system. As shown in FIG. 15, a range 286 of the machine coordinate system is divided in a grid, whereby a plurality of areas 287 are obtained. The contrast-map coordinate system is set up as a coordinate system showing the position coordinate of each area 287.

A contrast map 288 is set with reference to the contrast-map coordinate system. In this embodiment, the area of the set contrast map 288 is larger than the area of an image pickup area (camera view) 289. The contrast map 288 contains the image pickup area 289. In this embodiment, the contrast map 288 functions as a map-for-calculation.

The divided areas 280 are set up by dividing the object image 260 (image in image pickup area 289) such that the divided areas 280 may correspond to the plurality of areas 290 of the contrast map 288. In FIG. 15, the plurality of divided areas 280 are hatched (the number of the divided areas are smaller than that of FIG. 13 or the like). In view of this, the size of each of the plurality of areas 290 of the contrast map 288, i.e., the size of each of the plurality of areas 287 of the contrast-map coordinate system, is determined based on the approximate size of each divided area 280. For example, the size of each divided area 280 is n×n (pixels). In this case, the contrast-map coordinate system and the contrast map 288 are set based on the size (n×n pixels).

In this embodiment, the pixel size of the taken object image 260 is known. So, it is possible to calculate (calibrate) the length of the side of each divided area 280 in millimeters based on the pixel size. The contrast-map coordinate system is set up in millimeters based on the calculated length in millimeters. In this embodiment, the size of the object image 260 is 2048×1536 (pixels). The size of the divided area 280, i.e., the cell 281, is 128×128 (pixels). The object image 260 and the divided areas 280 are mapped on the machine coordinate system in millimeters.

The size of the contrast map 288, which is larger than the image pickup area 289, is not limited. In this embodiment, the image pickup area 289 including the plurality of divided areas 280 (7×5 cells in FIG. 15) is enlarged in the eight directions by the same rate, whereby the contrast map 288 including 21×15 cells is set. Alternatively, a different contrast map may be set as necessary.

As described above, the plurality of divided areas 280 are set up with reference to the contrast map 288 stored in the storage. The above-mentioned divided-area information on each of the plurality of divided areas 280 is updated every time the object image 260 is transferred to the PC 200, for example. For example, the divided-area information is updated every time the camera moves in the XYZ-axis directions.

The following pieces of divided-area information are stored, for example.

Cp . . . Largest contrast value.
Zp . . . Z position of the largest contrast.
Cu . . . Contrast value of the uppermost end of the range in which a user moves the camera manually until now.
Zu . . . Z position of the uppermost end of the range in which a user moves the camera manually until now.
Cl . . . Contrast value of the lowermost end of the range in which a user moves the camera manually until now.

Zl . . . Z position of the lowermost end of the range in which a user moves the camera manually until now.
Cc . . . Contrast value of the current image (corresponding to contrast value C.
Zc . . . Z position of the current image.
Bc . . . Brightness of the current image (corresponding to brightness Y).
W . . . Weighting coefficient determined based on the size of an area overlapping with a reference area
Cb . . . Contrast value of the previous image.
Zb . . . Z position of the previous image.
Bb . . . Brightness of the previous image.
Cb1 to n . . . Contrast value of past n images (history buffer)
Zb1 to n . . . Z position of past n images (history buffer)
Bb1 to n . . . Brightness of past n images (history buffer)
Zfocus_c . . . Divided-area in-focus position
Wcurrent . . . Reliability (weighting coefficient) of divided-area in-focus position Note that the Z position Zc of the current image is calculated based on the following interpolative calculation, where Zco is the Z position at which the current image is transferred, Zpo is the Z position at which the previous image is transferred, tdelay is transfer delay time of an image frame, and tframe (=1/frame rate) is an image transfer interval. Note that the formula for calculating Zc is not limited to the following interpolative calculation. Further some pieces of image data may be used to calculate the contrast of the like.

$$Zc = Zco - (Zco - Zpo) \times tdelay/tframe$$

Figure 16:
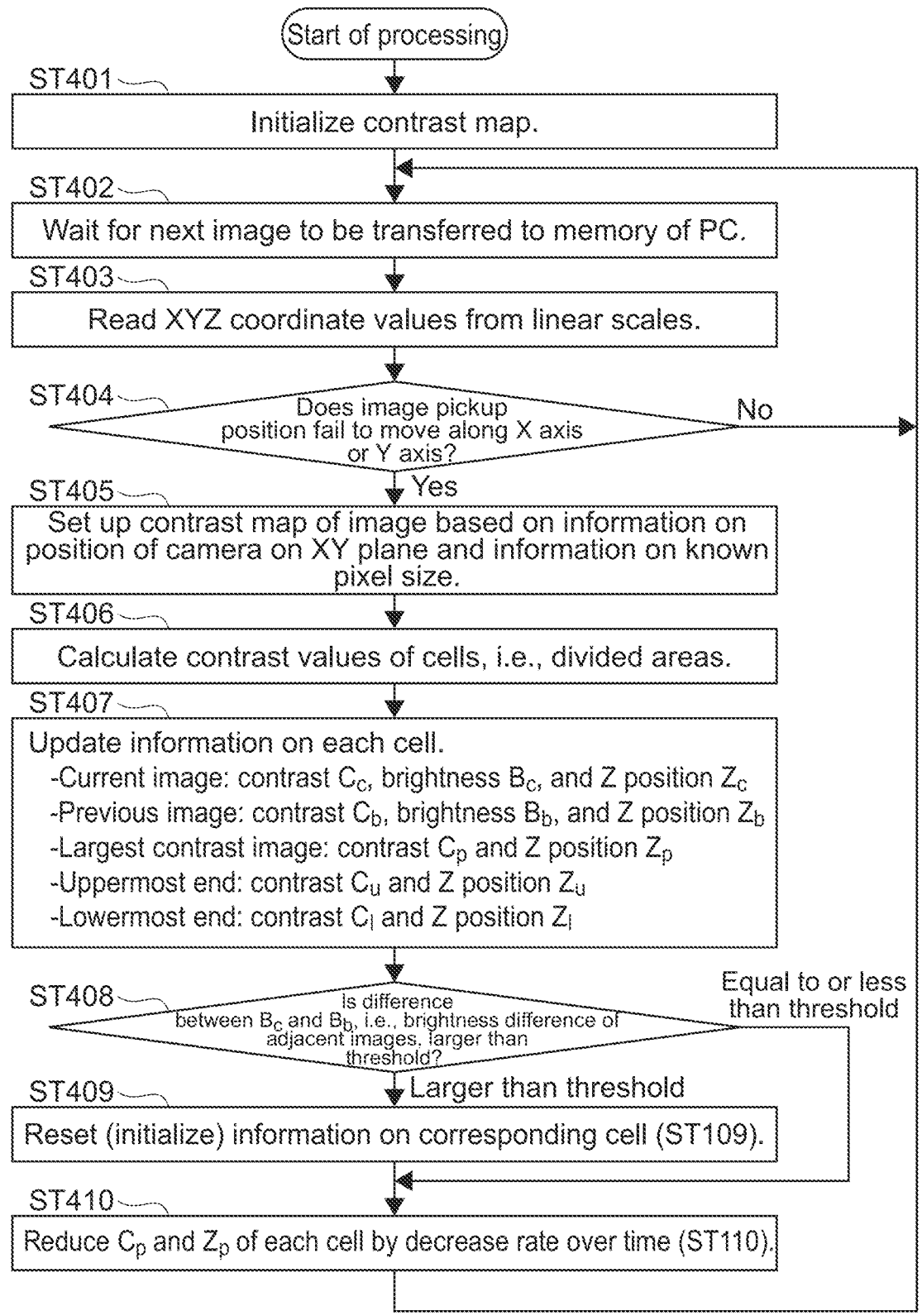
FIG. 16 is a flowchart showing an example of the way to update divided-area information.

FIG. 16 is a flowchart showing an example of the way to update divided-area information. First, the contrast map 288 is initialized (Step 401). The main PC 221 waits for the next image to be transferred (Step 402). The XYZ coordinate of the image pickup position 285 is obtained based on the machine coordinate system (Step 403). For example, the coordinate values are read from linear scales.

It is determined if the image pickup position 285 fails to move along the X axis or the Y axis or not. In other words, it is determined if the X coordinate value and the Y coordinate value of the image pickup position 285 fail to be changed or not (Step 404). If the X coordinate value and the Y coordinate value are changed (No in Step 404), the object image 260 is a flowing image. The accurate contrast value may not be calculated. So, the process is skipped and the flow returns to Step 402.

If the image pickup position 285 fails to move in the X axis and the Y axis (Yes in Step 404), the contrast map 288 is set up based on information on the position of the camera on the XY plane and information on the pixel size (Step 405). The contrast values of the divided areas 280 in the camera view 289 are calculated (Step 406).

The divided-area information on each cell is updated as follows (Step 407).

If Cc>Cp, Cp=Cc and Zp=Zc . . . the largest contrast value is updated.
If Zc>Zu, Cu=Cc and Zu=Zc . . . the contrast value of the uppermost end is updated.
If Zc>Zl, Cl=Cc and Zl=Zc . . . the contrast value of the lowermost end is updated.

After Cp, Zp, Cu, Zu, Cl, and Zl are determined, the determination processing of Step 105 in FIG. 3 is executed. Then, the contrast peak value and the divided-area in-focus position are calculated by model function fitting every time it is determined that a 0 contrast peak value is detectable (Step 406). Further, the reliability (weighting coefficient) of the divided-area in-focus position is calculated (Step 407). Then, the divided-area information (corresponding to predictive information) is updated using the formula exemplified in the like (Step 408).

At this time, the divided-area in-focus position may be determined as follows.

If Cu equals to Cp and if Cu is larger than Cl, it is determined that the focus position is above Zu, and the divided-area in-focus position is yet to be determined (blue cells are displayed).

If Cl equals to Cp and if Cl is larger than Cu, it is determined that the focus position is below Zl, and the divided-area in-focus position is yet to be determined (yellow cells are displayed).

With reference to the flowchart again, in Step 408, the difference between Bc and Bb, i.e., the brightness difference of the adjacent images, is calculated. If the difference between Bc and Bb is larger than a predetermined threshold, information on the corresponding cell is reset (initialized) (Step 409). In other words, if the brightness of the image (in cell) is changed drastically, then it is determined that there occurs a great change (e.g., the work 3 is replaced, etc.). Then, it is determined that previous contrast information is not used, and the contrast information is reset. If the divided-area in-focus position is determined, the lock-on is canceled.

If the difference between Bc and Bb is equal to or less than the predetermined threshold, then Cp and Zp of each cell are reduced by the decrease rate over time (Step 410). This is according to the process of FIG. 16. If the process of Step 410 is finished, the flow returns to Step 402. In other words, the loop processing is continued from the start of the program to the end of the program.

Next, with reference to FIG. 17 to FIG. 19, the processing relating to movement of the image pickup position 285 will be described. For example, when a user adjusts the position 121 of the camera 118 manually, he/she moves the work 3 in the XY plane direction to the center of the screen, or he/she inputs an operation to adjust the height of the camera 118. For example, when adjusting the position 121 of the camera 118 or when searching for a target as described above, the image pickup position 285 is moved in the XY plane direction.

Figure 17:
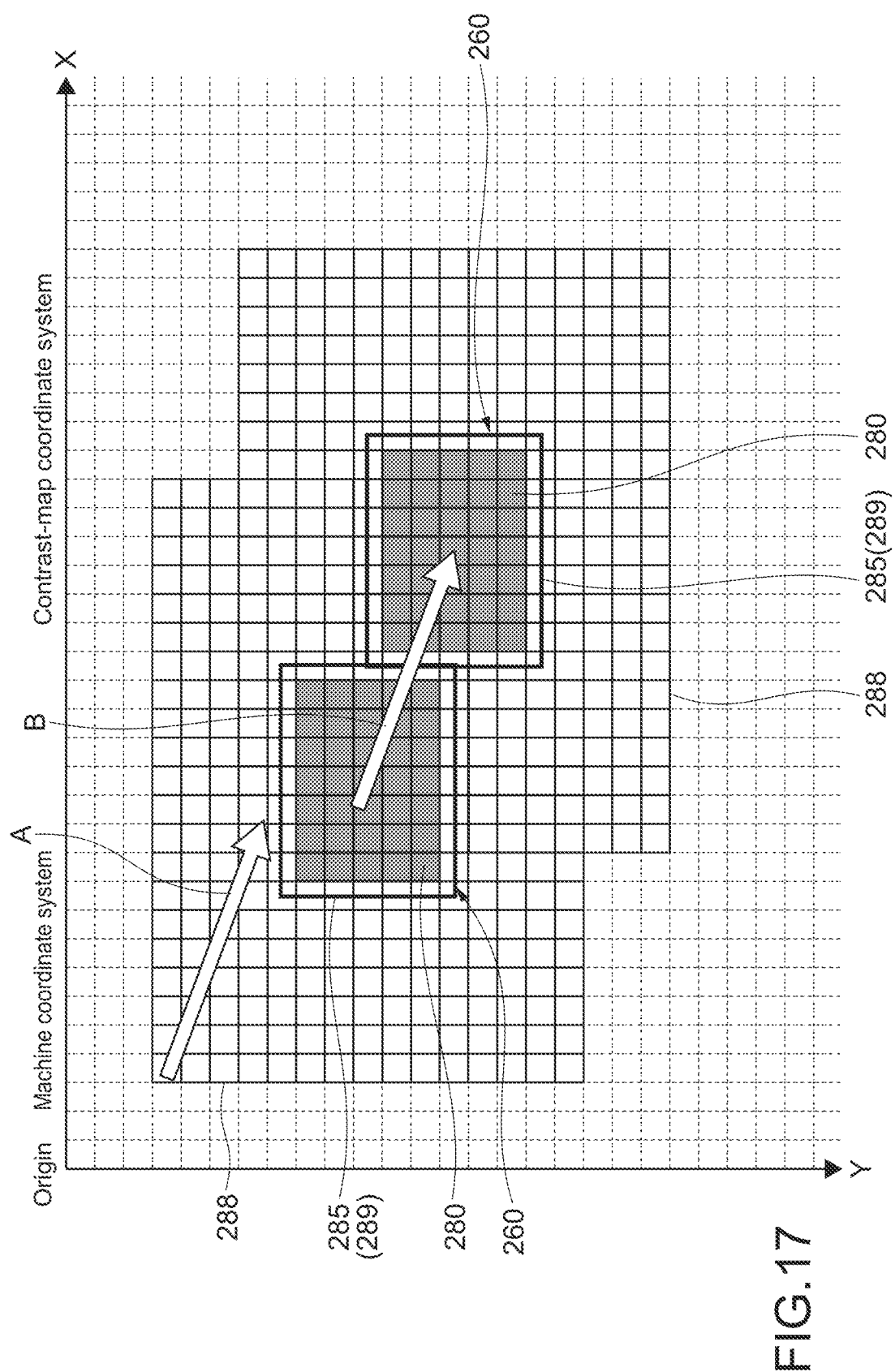
FIG. 17 is a diagram illustrating the way to move a contrast map.

For example, the image pickup position 285 of FIG. 15 is moved two-dimensionally on the mount surface as shown in FIG. 17. Then, the set position of the contrast map 288 is moved depending on the movement of the image pickup position 285 (see arrows A and B of FIG. 17) based on the coordinate information on the image pickup position 285 and based on information on the pixel size.

Figure 18:
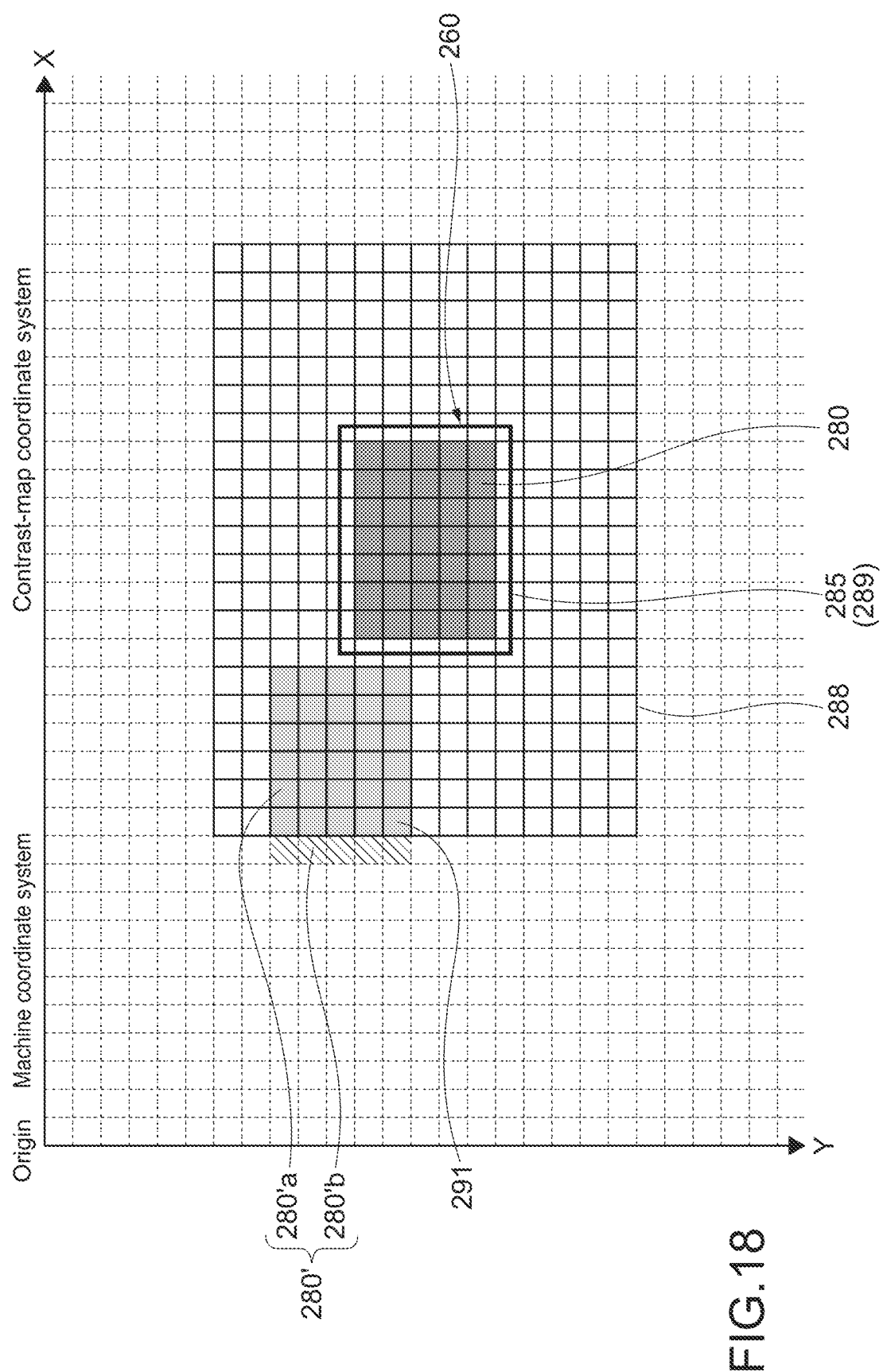
FIG. 18 is a diagram illustrating the way to move the contrast map.

FIG. 18 is a diagram showing the state where the image pickup position 285 has been moved. In FIG. 18, divided-area information is updated for each dark-gray moved divided area 280. The yet-to-be-moved divided areas 280' include light-gray areas 280'a and hatched areas 280'b. The yet-to-be-moved divided areas 280' are outside of the image pickup area 289. So, divided-area information on each yet-to-be-moved divided area 280' is not updated.

The moved contrast map 288 includes the light-gray areas 280'a outside of the yet-to-be-moved divided areas 280'. The areas 280'a are outside of the image pickup area 289 and in the moved contrast map 288. Such areas 280'a are referred to as stored areas 291. Divided-area information, which was updated when each divided area 280 was set, is stored for each stored area 291. Meanwhile, the hatched areas 280'b are outside of the moved contrast map 288. So, the divided-area information on each hatched area 280'b updated in the past is deleted.

Figure 19:
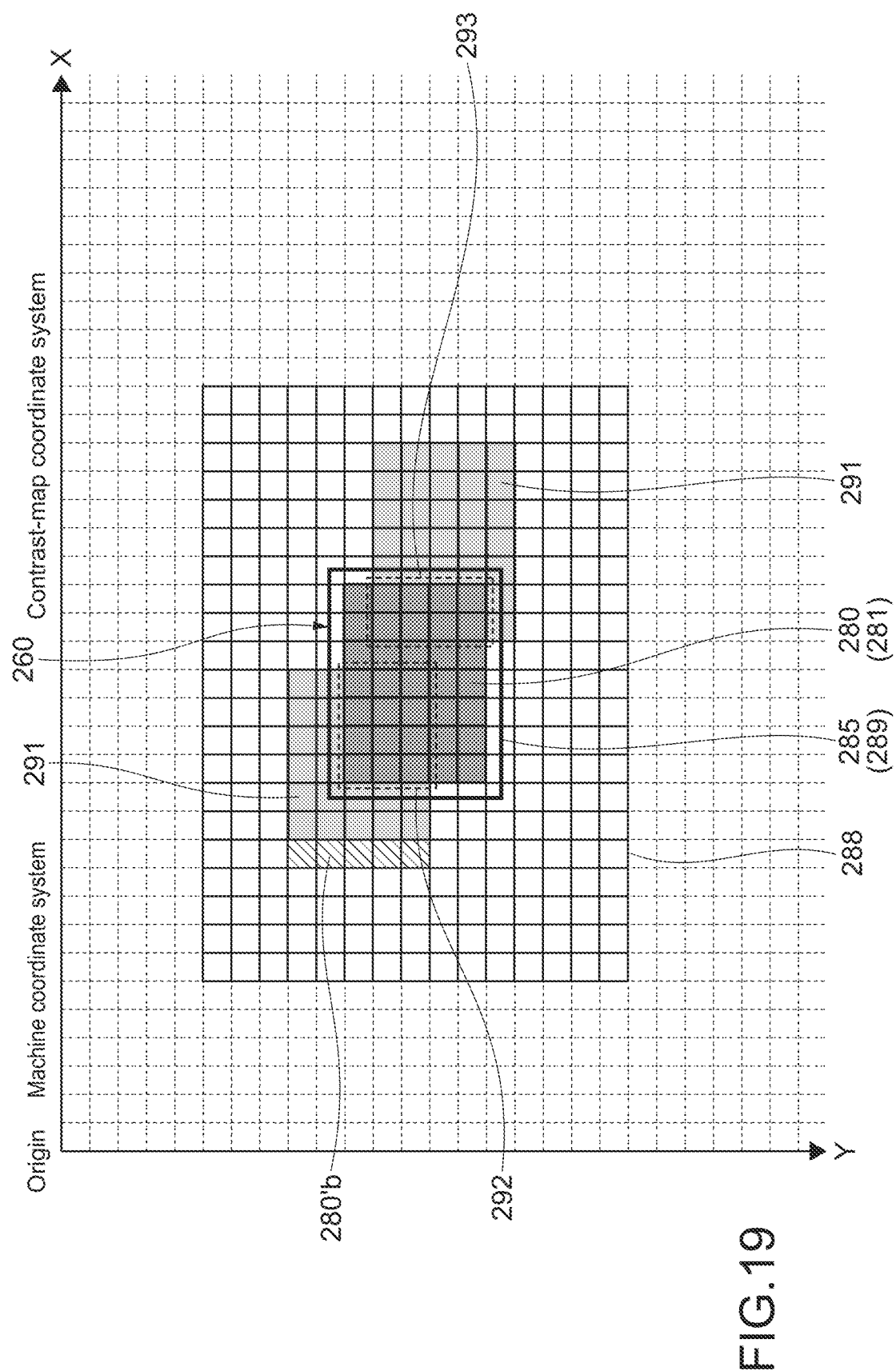
FIG. 19 is a diagram illustrating the way to move the contrast map.

The image pickup position 285 of FIG. 18 is moved as shown in FIG. 19. Divided-area information is updated for each cell 281 of each dark-gray divided area 280. Further, the moved contrast map 288 includes the stored areas 291 out of the cells 281 of the yet-to-be-moved divided areas 280'. Divided-area information on each stored area 291 is stored. When divided-area information on each divided area 280 is updated, divided-area information on each stored area 291, which was stored before the divided areas 280 are moved, is referred to as necessary.

In other words, in FIG. 19, the pieces of divided-area information on the divided areas 280 in a portion 292 and the divided areas 280 in a portion 293, which are stored in the past, are referred to and updated. The divided areas 280 in the portion 292 overlap with the stored areas 291, which are set when the divided areas 280 are moved as shown in FIG. 18. The divided areas 280 in the portion 293 overlap with the stored areas 291, which are set when the divided areas 280 are moved as shown in FIG. 19. As a result, a calculation time period and a calculation amount may be reduced. Note that the divided-area information on each hatched area 280'b of FIG. 18 has been deleted, and will never be restored.

As described above, in this embodiment, the contrast map 288 larger than the image pickup area 289 is set. The set position of the contrast map 288 is moved as the image pickup position 285 is moved. As a result, even if the image pickup position 285 is moved, it is possible to calculate the focus position Z_focus of the image pickup position 285 at the new position at a high velocity. In other words, wherever the image pickup position 285 is within the movable range, it is possible to calculate the focus position Z_focus at a high velocity.

Further, divided-area information on each divided area 280 of the object image 260 is stored for each area 290 (cell) of the set contrast map 288. Each divided area 280 corresponds to each area 290. The divided-area information includes contrast information, divided-area in-focus position information, and the reliability (weighting coefficient) of the divided-area in-focus position. Then, if the image pickup position 285 is moved, the divided-area information on each area 290 in the contrast map 288, which was stored before the image pickup position 285 is moved, is referred to. The divided-area information on each moved divided area 280 is updated. As a result, it is possible to calculate the divided-area in-focus position of each moved divided area 280 and the reliability (weighting coefficient) of the divided-area in-focus position in a short time.

Figure 20:
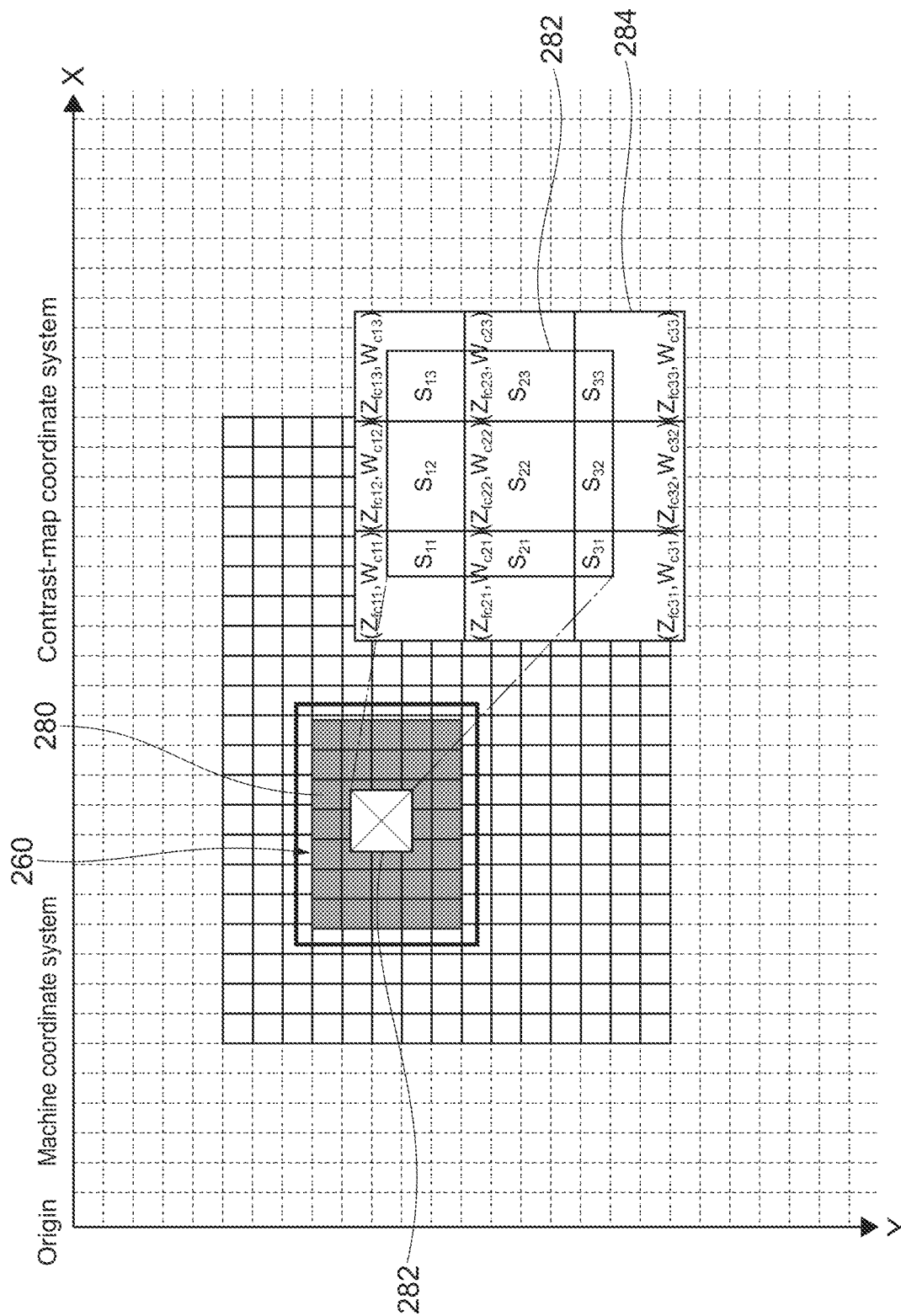
FIG. 20 is a diagram illustrating an example of calculating a first in-focus position and reliability of the first in-focus position based on divided-area information.

FIG. 20 is a diagram illustrating a specific example of calculating the first in-focus position 125 and the reliability (weighting coefficient) of the first in-focus position 125 based on divided-area information. As shown in FIG. 20, the reference area 282 is set at the center of the object images 260. Then, the calculation-object areas 284 are set. The calculation-object areas 284 overlap with the reference area 282. The first in-focus position Zfocus_c (described as Zfc in FIG. 20 and in the formula) and the reliability Wcurrent (described as Wc in FIG. 20 and in the formula) of the first in-focus position Zfocus_c are calculated based on the following formula by using divided-area information on each calculation-object area 284.

$$Zfc = \Sigma(Zfci,j \times Si,j)/ZSi,j$$

$$Wc = \Sigma(Wci,j \times Si,j)/ZSi,j$$

where Zfci,j is the divided-area in-focus position of each calculation-object area 284, Wci,j is the reliability (weighting coefficient) of the divided-area in-focus position, and Si,j is the size of the area in which part of the reference area 282 overlaps with the calculation-object area 284.

In this manner, the calculation-object areas 284 are weighted based on the size of the area in which part of the reference area 282 overlaps with the calculation-object area 284. As a result, it is possible to calculate the first in-focus position 125 and the reliability (weighting coefficient) of the first in-focus position 125 with a high degree of accuracy. Note that Cu, Cl, Zu, and Zl of the entire object image 260 may be calculated based on the formula similar to the above-mentioned formula, and the first in-focus position 125 may be determined.

Note that if an imaging optical system including an objective lens forms an image of a work and the image is taken, an interchangeable mechanism such as a revolver may interchange objective lenses of the imaging optical system, or a user may replace objective lenses. For example, an objective lens is interchanged to or replaced by an objective lens having a predetermined magnification (hereinafter, collectively referred to as "to interchange objective lenses"). As a result, a user may observe an object image at a predetermined magnification.

If objective lenses are interchangeable with each other, contrast maps may be stored for the objective lenses used in an imaging optical system, for example. Each contrast map is used to calculate the first in-focus position. For example, if three objective lenses are interchangeable with each other, three contrast maps are stored corresponding to the three objective lenses, respectively. A contrast map and divided-area information are stored in storage for each divided area. The divided-area information is set with reference to the contrast map for each objective lens to be used. Note that the number of interchangeable objective lenses and the number of contrast maps stored corresponding to the interchangeable objective lenses are not limited.

If the objective lenses are interchanged, the contrast map and the divided-area information corresponding to an objective lens are read as necessary, and the first in-focus position is calculated. For example if a user operates the vision measuring apparatus 300 with a first objective lens, a program reads a first contrast map corresponding to the first objective lens, and updates divided-area information every time an object image is input. After that, a user interchanges the first objective lens with a second objective lens, and operates the vision measuring apparatus 300. In this case, the program reads a second contrast map corresponding to the second objective lens, and updates divided-area information calculated with reference to the second contrast map. After that, if a user interchanges the second objective lens with the first objective lens again and operates the vision measuring apparatus 300, the first contrast map is read again. Further, divided-area information is updated again with reference to the previously-updated first contrast map every time an object image is input.

As described above, a contrast map is stored for each objective lens. If objective lenses are interchanged, a corresponding contrast map is read. As a result, even if objective lenses are interchanged, it is possible to perform predictive AF immediately after that.

Further, for example, a zoom lens may be used as an objective lens, and the zoom position of the zoom lens may be controlled, to thereby change magnification at a plurality of levels. In this case, contrast maps, each of which is used to calculate a first in-focus position, may be stored for each magnification to be changed, for example. If magnifications are interchangeable in three levels by controlling the zoom position, for example, three contrast maps are stored corresponding to the three-level magnifications, respectively. When a user operates the vision measuring apparatus 300, a contrast map and divided-area information corresponding to the magnification of the objective lens are read as necessary, and the first in-focus position is calculated. As a result, even if magnifications are interchanged, it is possible to perform predictive AF immediately after that.

Figure 21:
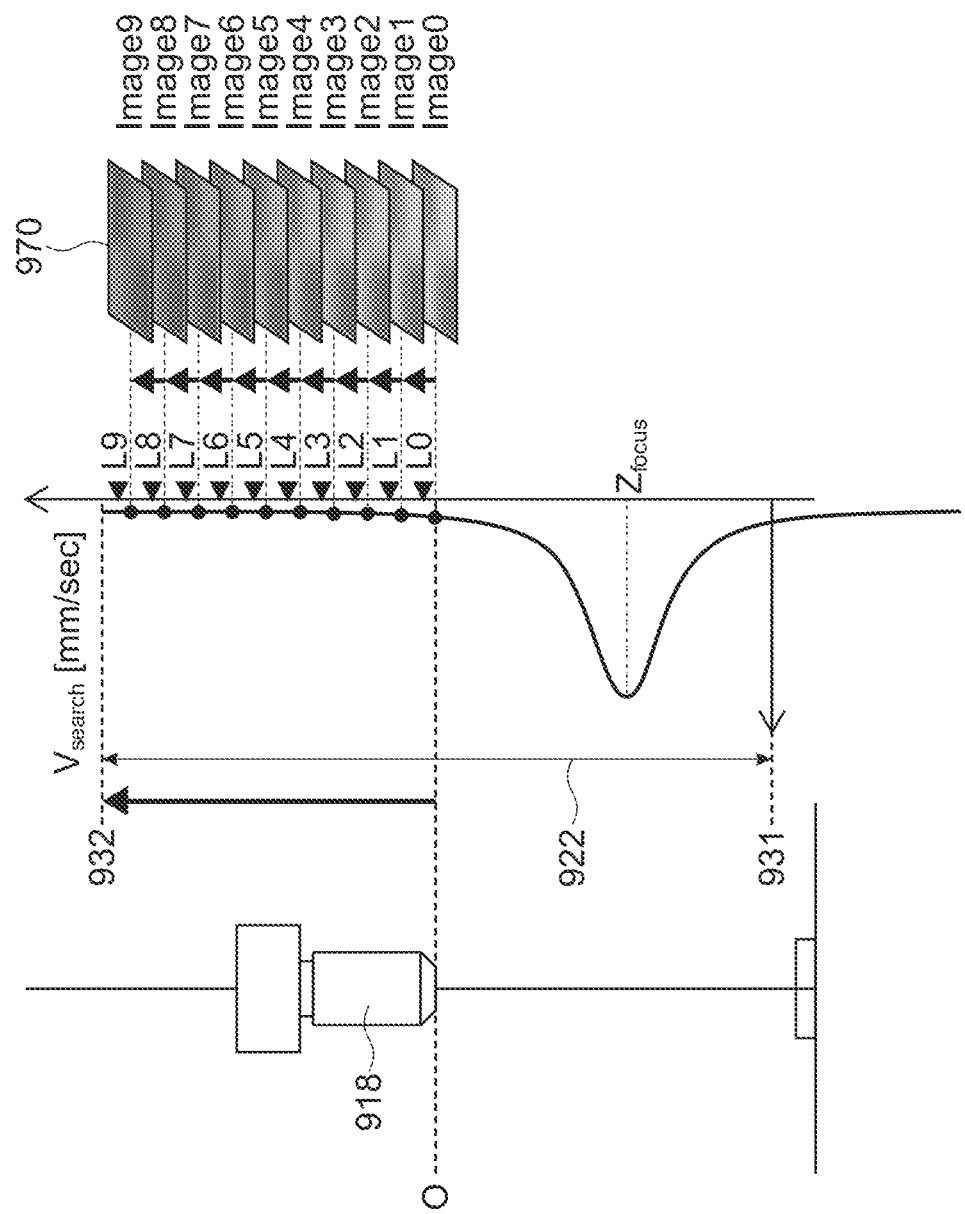
FIG. 21 is a diagram illustrating existing AF of a comparative example.
Figure 22:
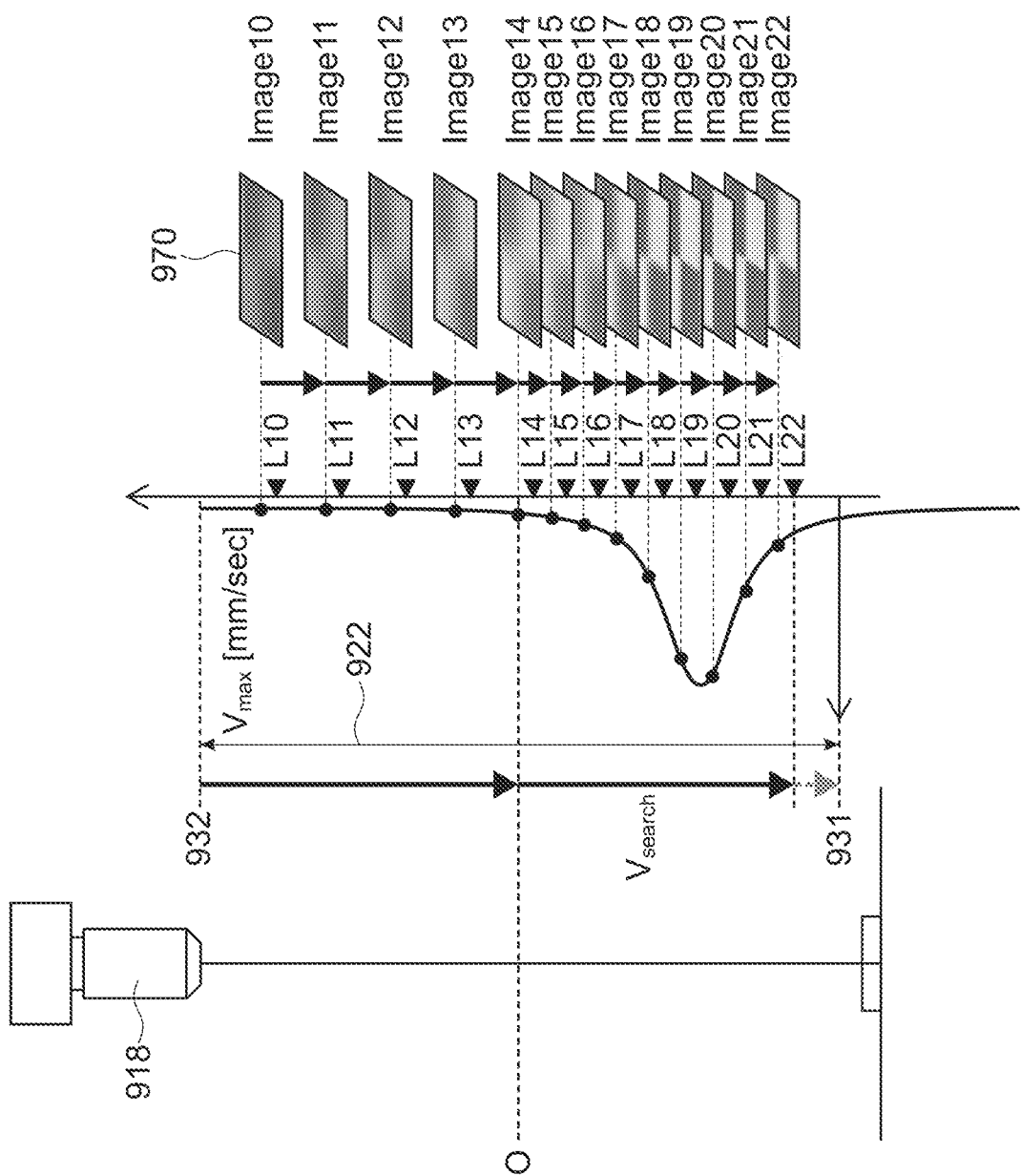
FIG. 22 is a diagram illustrating existing AF of the comparative example.

FIG. 21 and FIG. 22 are diagrams illustrating existing AF of the comparative example. As shown in FIG. 21, the focus position Z_focus is at a lower portion of a search range 922. Further, in response to an AF instruction, search is started at a low velocity Vsearch in the upward direction from a center O of the search range 922. In this case, as shown in FIG. 21, a contrast peak is not detected even if a camera 918 reaches an uppermost end 932 of the search range 922.

Then, as shown in FIG. 22, the camera 918 returns from the uppermost end 932 of the search range 922 to the center O at a high velocity Vmax. Then, search toward a lowermost end 931 of the search range 922 is started at the velocity Vsearch. The contrast peak is detected at last when an object image 970 (Image22) is obtained during this search. Then, the camera 918 moves to the focus position Z_focus.

In other words, according to the AF in the past, as shown in FIG. 21, the first search is needless, and it takes a long time to calculate the focus position Z_focus. In other words, it takes a long time for AF. For example, an optical system has a small focus depth, and a search range is large to increase user-friendliness of manual adjustment. In such a case or other cases, needless search of FIG. 21 and FIG. 22 is likely to occur. If the focus position Z_focus is in the vicinity of the end opposite to the first moving direction, the scanning distance is approximately half again the length of the search range 922.

FIG. 23 are graphs each showing processing time when existing AF of the comparative example is performed. "1st fit range" is a range in which a contrast value of each object image is fitted by the method of least squares to obtain a parameter of a model formula of a contrast curve (fitted curve). For example, a contrast value larger than a predetermined threshold is used.

Figure 23A:
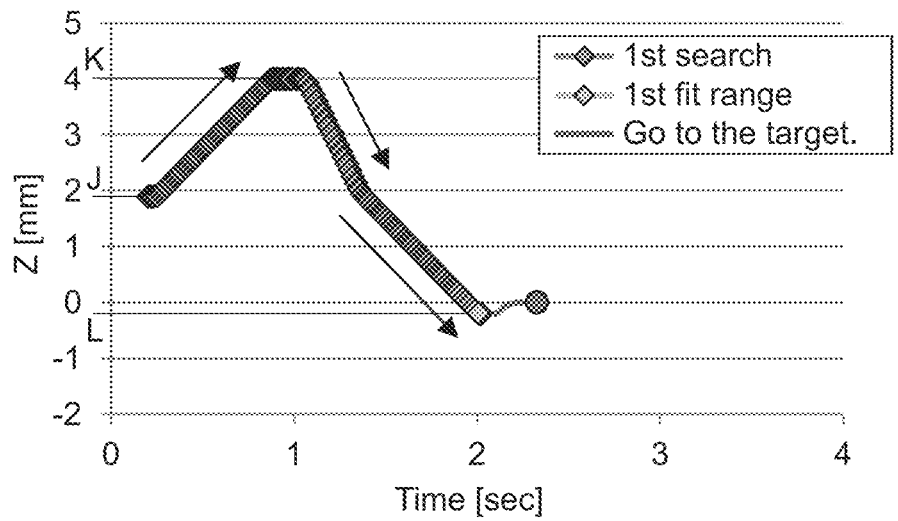
FIGS. 23A and 23B are graphs showing processing time of the existing AF of the comparative example.

FIG. 23A is a diagram when AF has been started from the position of Z=approximately +1.8 mm and search has been executed once. The example of FIG. 23A corresponds to the AF operation shown in FIG. 21 and FIG. 22. In other words, search is executed from a position J to the uppermost end of the search range, i.e., a position K. A contrast peak is not detected in the range. The camera returns to the position J at a high velocity. Then, search is executed to a position L, and a focus position is calculated.

As shown in FIG. 23A, it takes approximately two seconds to detect a focus position. It takes approximately 2.3 seconds for the camera to move to the focus position. Meanwhile, in this embodiment, the camera moves to the focus position (first in-focus position) simultaneously with the input of an AF instruction. As a result, it is possible to reduce the time of AF by approximately two seconds.

Figure 23B:
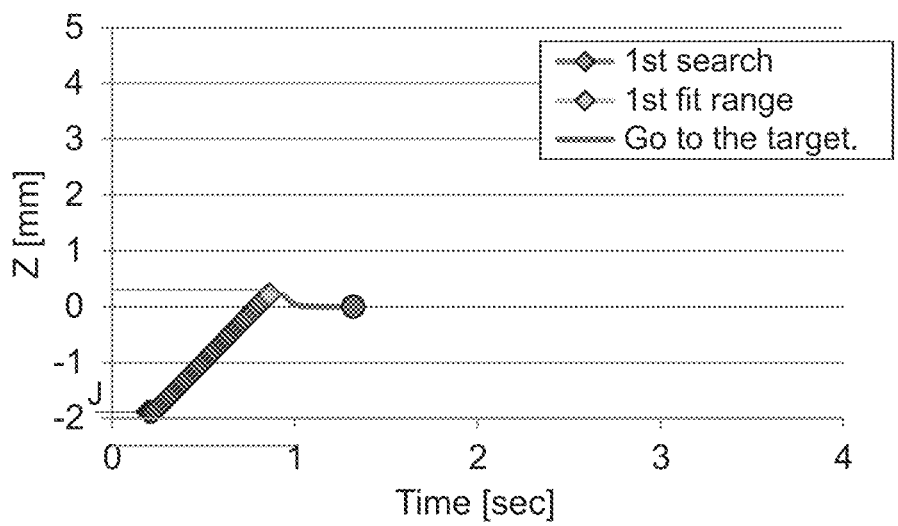

FIG. 23B is a diagram when AF has been started from the position of Z=approximately −1.8 mm and search has been executed once. Search is executed at a low speed from the starting position, i.e., the position J. In this case, it takes approximately 0.9 seconds to detect a focus position. It takes approximately 1.4 seconds for the camera to move to the focus position.

Meanwhile, in this embodiment, the camera moves to the focus position (first in-focus position) simultaneously with the input of an AF instruction. As a result, it is possible to reduce the time of AF by approximately 0.9 seconds. As described above, even when a focus position is in the first search direction, it is possible to calculate a focus position at a high velocity as compared with the case of existing AF.

FIG. 24 are graphs each showing processing time when the first search in this embodiment is performed. "1st fit range" in FIG. 24 is corresponds to the first predictive search range in which the first search is executed.

Figure 24A:
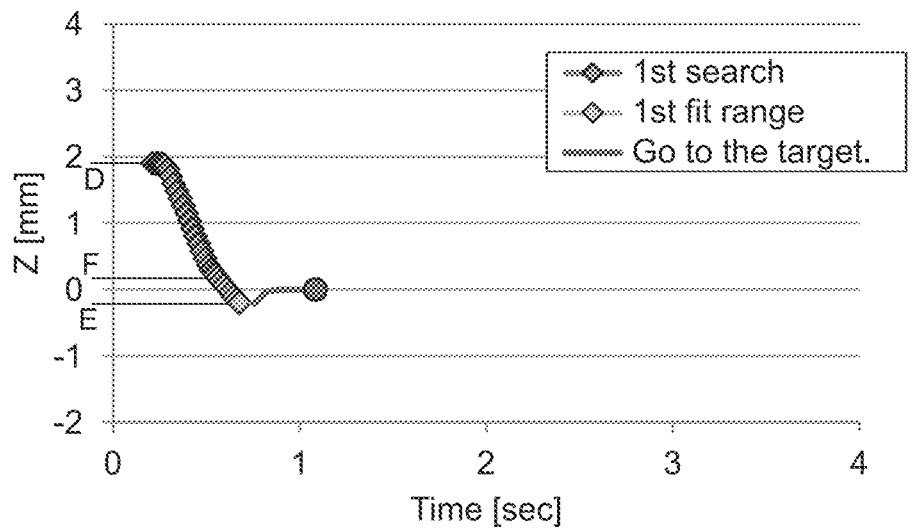
FIGS. 24A and 24B are graphs showing processing time when the first search is executed.

FIG. 24A is a diagram when AF is started from above the focus position. In response to an AF instruction, AF is started at the position (Z=approximately +1.8 mm) above the focus position. As shown in FIG. 24A, the camera moves to the starting position of the first predictive search range at a high velocity. Search is performed within the predictive search range at a low velocity. A contrast curve is calculated by the search performed at a low velocity. A second in-focus position is calculated as a focus position based on the contrast curve.

As shown in FIG. 24A, the focus position Z_focus is detected in approximately 0.7 seconds. Then, the camera moves to a focus position in approximately 1.1 seconds. In other words, even when the first search is executed, the time of AF is reduced. The difference of the time of AF between the AF in this embodiment and the existing AF is approximately 1.2 seconds. The AF of the embodiment is performed about 2.1 times faster than the existing AF.

Figure 24B:
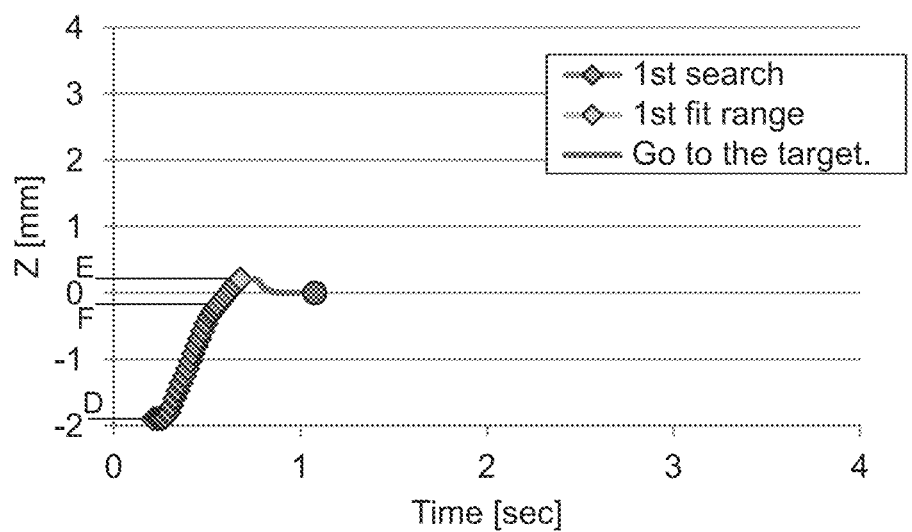

FIG. 24B is a diagram when AF is started from below the focus position. In response to an AF instruction, AF is started at the position (Z=approximately −1.8 mm) below the focus position. As shown in FIG. 24B, the camera moves to the starting position of the first predictive search range at a high velocity. Search is performed within the first predictive search range at a low velocity. A contrast curve is calculated by the search performed at a low velocity. A second in-focus position is calculated as a focus position based on the contrast curve.

As shown in FIG. 24B, the focus position Z_focus is detected in approximately 0.7 seconds. Then, the camera moves to a focus position in approximately 1.1 seconds. In other words, even when the first search is executed, the time of AF is reduced. The difference of the time of AF between the AF in this embodiment and the existing AF is approximately 0.3 seconds. The AF of the embodiment is performed about 1.3 times faster than the existing AF.

As described above, the vision measuring apparatus 300 of this embodiment executes, for example, fitting using a model function or the like based on the pieces of contrast information on the object images of the manually-taken object image group 265 obtained by taking images of the work 3 while moving the position (focal position) of the camera 118 manually. As a result, it is possible to calculate the first in-focus position 125 of the camera 118 relative to the work 3 at a high velocity. For an AF instruction input by a user, it only needs to move the position (focal position) of the camera 118 to the calculated first in-focus position 125. Therefore, it is possible to reduce the time of AF.

Further, by calculating the reliability of the first in-focus position 125, it is possible to determine whether the first in-focus position 125 is used as a focus position or the first search is executed, as necessary. As a result, it is possible to maintain a high degree of accuracy of a focus position.

For example, a digital microscope is used as the vision measuring system. Because the focus depth of an objective lens of an optical microscope is small, the contrast is decreased if the focus is out of the contrast peak (focus position) if only a little. The higher the magnification, the larger the decreasing rate of contrast. It is necessary to make search velocity lower in such an optical system having the small focus depth. Meanwhile, it is necessary to make the search range larger to improve user-friendliness of AF. If the search velocity is lower and if the search range is larger, it takes longer time to perform AF.

According to the vision measuring apparatus 300 of this embodiment, as preparation for AF, a program calculates the first in-focus position 125 as a focus position every time the camera passes through the focus position when a user adjusts the Z position of the camera. In other words, the contrast of each image is monitored before AF processing. As a result, a focus position (the first in-focus position 125) is previously obtained. When AF is performed, the camera moves at a high velocity to the calculated first in-focus position 125. As a result, it is possible to perform AF at a high velocity with a high degree of accuracy.

In other words, in this embodiment, a contrast peak is constantly obtained for the same image information as that of an image of a work viewed by an operator performing a manual operation. As a result, it is possible to eliminate a search operation for searching for a focus position when AF is performed, and cause the camera to directly move to the focus position.

As a result, it is possible to implement search-less AF in which the search operation is eliminated. It is also possible to improve the measurement throughput by reducing the time of AF, and improve the user-friendliness for the operator. Further, by calculating the reliability of the first in-focus position, it is possible to implement AF with a high degree of accuracy.

Further, the program holds a contrast map containing a camera view divided in a grid. The program keeps on searching for the contrast peak value in the grid even if AF is not being performed. The position information on the XYZ-axis scales and the pixel size of an object image are known. If the stage and the image pickup unit move, the contrast map of the program is moved in combination. A contrast map containing an area outside of the camera view is created based on position information on the XYZ-axis scales. As a result, it is possible to perform AF at an arbitrary position at a high velocity with a high degree of accuracy. In other words, it is possible to perform AF at an arbitrary position in the view at a high velocity with a high degree of accuracy. User-friendliness is increased largely. Further, a high degree of accuracy is attained, user-friendliness is increased, and processing time is reduced at the same time.

Further, the present disclosure is realized only by software algorithm. It is not necessary to prepare special hardware. So, it is possible to increase the performance without increasing costs. As a result, AF accuracy as high as in the past may be realized at a high velocity without increasing costs.

Further, according to the present disclosure, the following effects may be obtained. Note that all the following effects may not be obtained simultaneously, but some of the following effects may be obtained depending on conditions and the like.

It is possible to focus on a desired position, and stress-free observation and measurement may be realized.

It is possible to perform 3D measurement at a higher velocity with a high degree of accuracy by using the XYZ-axis linear scales.

It is possible to perform AF at a high velocity at any position within a wide focus search range.

It is possible to further increase user-friendliness of focusing of an optical microscope.

If the magnification of an objective lens is larger (focus depth is smaller), user-friendliness of focusing may be increased.

The present disclosure may be realized by a low-cost system configuration only including a microscope optical system having an electric stage and a camera.

It is not necessary to prepare expensive options for high-velocity AF.

It is possible to realize high-velocity AF in previously-shipped systems by only upgrading software.

Other Embodiments

The present disclosure is not limited to the above-mentioned embodiment. Other various embodiments may be implemented.

In the above description, a first in-focus position and the reliability of the first in-focus position are updated every time the contrast peak value is calculated. The present disclosure is not limited thereto. AF may be executed based on the latest first in-focus position and the reliability of the latest first in-focus position. Alternatively, the predictive AF may be finished when the first in-focus position and the reliability are calculated. If the continuous predictive AF is performed, then it is possible to calculate the first in-focus position with a high degree of accuracy. Meanwhile, if the predictive AF is finished in progress, then the calculation amount and the processing time may be reduced.

Further, it does not necessarily need to calculate the reliability, and the average of first in-focus positions calculated in the past may be calculated as the updated first in-focus position. For example, whether the reliability is used or the first in-focus position is updated may be determined as necessary depending on the acceptable AF accuracy.

The method of calculating an in-focus position again when the reliability of the first in-focus position is low is also not limited, and may be determined arbitrarily. The technology disclosed in Japanese Patent Application Laid-open No. 2015-55770 may be used as necessary. As a matter of course, another search method or the like may be used.

As described above, the reliability of the first in-focus position changes depending on the moving velocity of the camera, the constancy (change amount) of the velocity, and the contrast peak value when the object image of the manually-taken object image group is taken.

In view of this, the driver shown in FIG. 2 may control, as necessary, the operation of moving the camera (operation of moving the focal position) corresponding to the manual operation for moving the position (focal position) of the camera by a user. In other words, how the focal position is actually moved may be controlled as necessary according to the manual operation for moving the focal position.

For example, the moving velocity of the camera and the change (change amount) of the moving velocity are controlled. Actually, even if an operation for moving the focal position at a high velocity or at a low velocity is input, the camera 118 moves at an appropriate velocity so that the reliability of the first in-focus position is increased. For example, the upper limit or lower limit of the velocity may be set.

Actually, even if an operation in which the constancy of the moving velocity is low, i.e., the change (change amount) of the moving velocity is large, is input, the camera 118 moves at a constant velocity. As described above, by appropriately control the operation of moving the camera corresponding to the manual operation when the object image of the manually-taken object image group is taken, it is possible to improve the reliability of the first in-focus position. As a result, it does not necessarily need to perform the first search, and it is possible to cause the camera to directly move to the focus position. Therefore, it is possible to reduce the time of AF.

For example, when the first in-focus position is updated as described above, the moving operation according to the operation is executed at the time of manually adjusting the position of the camera for the first time. The moving velocity of the camera 118 and the change (change amount) of the moving velocity are appropriately controlled at the time of manually adjusting the position of the camera for the second and subsequent times. As a result, it is possible to quickly and roughly detect a focus position (first in-focus position) at the time of the first adjustment. Then, it is possible to calculate the first in-focus position with a high degree of accuracy at the time of the second and subsequent adjustment.

The notification unit shown in FIG. 2 may notify, as notification information regarding the reliability of the first in-focus position calculated by the reliability calculator, at least one of information regarding the calculated reliability of the first in-focus position and information regarding the operation method of manually moving the focal position by a user.

For example, every time the camera passes through a focus position by a manual operation and a first in-focus position is calculated, the reliability of the first in-focus position may be notified via a GUI, sound, or the like. As a matter of course, the degree of reliability such as "high, medium, low" may be notified. As a result, a user is capable of intuitively understanding the operation method in which a first in-focus position can be calculated with a high degree of reliability.

Further, teaching information for instructing the moving velocity of the camera and the change (change amount) of the moving velocity may be output via a GUI, sound, or the like. For example, teaching information such as "Please slow down" or "Please move camera at constant velocity" is output as notification information. As a result, it is possible to guide the user to perform an operation in which a first in-focus position can be calculated with a high degree of reliability. Further, the user is capable of easily understanding the operation method in which a first in-focus position can be calculated with a high degree of reliability.

If a high accuracy mode is being selected, when the reliability of a first in-focus position has a value larger than a predetermined threshold, it is not necessarily need to execute the second search and the position of the camera may be directly moved to the first in-focus position. In other words, when very high reliability is calculated, the first in-focus position is regarded as a focus position with a high degree of accuracy calculated by executing the second search. For example, if the level of the operation of moving the camera by a user is equal to the level of the operation of moving the camera in the second search, it is possible to omit the second search. In order to determine whether or not such a manual moving operation is performed, it only needs to set an algorithm for calculating the reliability, a threshold, and the like, as appropriate.

As a matter of course, the driver may control the operation of moving the camera according to the manual operation so that the level of the operation of moving the camera by a user may be the same as the level of the operation of moving the camera in the second search. Alternatively, teaching information or the like may be notified as necessary to guide a user to perform an operation of moving the camera such that the level of the operation of moving the camera by the user may be the same as the level of the operation of moving the camera in the second search.

For example, the size of the contrast map 288 of FIG. 15 may be changed. Specifically, the entire movable range of the image pickup position 285, i.e., the entire contrast-map coordinate system, may be set up as the contrast map 288. In this case, even if the image pickup position 285 is moved, it is not necessary to move the contrast map 288. Meanwhile, in the above-mentioned embodiment, the contrast map 288 is part of the coordinate system. In this case, it is possible to, for example, reduce a load applied to the memory of the PC 200.

For example, in a CNC device or the like, the processing shown in FIG. 3 may be executed to generate predictive information for an operation being automatically executed before AF. If the predictive information is usable (e.g., the reliability of a first in-focus position included in the predictive information has a value larger than a predetermined threshold), the camera moves to the first in-focus position as a focus position. As a result, a search operation is not performed and AF is finished. Therefore, it is possible to significantly reduce the time of AF. Note that processing corresponding to the above-mentioned manual operation of moving the focal position may be automatically executed to generate predictive information.

At least two features of the above-mentioned features according to the present disclosure may be combined. Further, the various effects described above are merely examples and are not limited, and additional effects may be exerted.

What is claimed is:

1. An information processing apparatus, comprising:
    an obtaining unit configured to obtain a manually-taken object image group, the manually-taken object image group including a plurality of object images, the plurality of object images being generated by taking images of an object while moving a focal position of an image pickup device manually, the obtaining unit being capable of obtaining an automatically-taken object image group, the automatically-taken object image group including a plurality of object images, the plurality of object images being generated by taking images of the object while moving the focal position of the image pickup device automatically;
    a first calculator capable of calculating, based on pieces of contrast information on the plurality of object images in the obtained manually-taken object image group, a first in-focus position of the image pickup device relative to the object by performing fitting using a predetermined function;
    a reliability calculator configured to calculate reliability of the calculated first in-focus position;
    a driver capable of moving, based on an autofocus instruction input by a user, if the reliability of the calculated first in-focus position has a value larger than a predetermined threshold, the focal position of the image pickup device to the calculated first in-focus position; and
    a second calculator capable of calculating, if the reliability of the calculated first in-focus position has a value smaller than the predetermined threshold, a second in-focus position of the image pickup device relative to the object, based on the calculated first in-focus position and based on pieces of contrast information on the plurality of object images in the obtained automatically-taken object image group.

2. The information processing apparatus according to claim 1, wherein
    the obtaining unit is capable of obtaining pieces of focal position information on the plurality of object images in the manually-taken object image group, and
    the reliability calculator is configured to calculate the reliability of the first in-focus position based on the pieces of obtained focal position information.

3. The information processing apparatus according to claim 1, wherein
    the first calculator is configured
        to calculate a contrast peak value by performing the fitting, and
        to calculate the focal position corresponding to the contrast peak value as the first in-focus position, and
    the reliability calculator is configured to calculate the reliability of the first in-focus position based on the contrast peak value.

4. The information processing apparatus according to claim 1, wherein
    the driver is capable of controlling an operation of moving the focal position corresponding to a manual operation for moving the focal position by a user.

5. The information processing apparatus according to claim 4, wherein
    the driver is capable of controlling a moving velocity of the focal position and a change of the moving velocity of the focal position.

6. The information processing apparatus according to claim 1, further comprising:
    a notification unit capable of outputting notification information regarding the reliability of the calculated first in-focus position.

7. The information processing apparatus according to claim 6, wherein
    the notification information includes at least one of information regarding the reliability of the calculated first in-focus position and information regarding an operation method of manually moving the focal position by a user.

8. The information processing apparatus according to claim 1, further comprising
    a determining unit configured to determine whether or not a contrast peak value can be calculated, wherein
    the first calculator is configured to calculate the first in-focus position every time the determining unit determines that the contrast peak value can be calculated.

9. The information processing apparatus according to claim 8,
    the first calculator is configured to calculate the first in-focus position based on the first in-focus position calculated in the past and based on reliability of the first in-focus position calculated in a past, and
    the reliability calculator is configured to calculate the reliability of the first in-focus position based on the reliability of the first in-focus position calculated in a past.

10. The information processing apparatus according to claim 9, wherein
    the first calculator is configured to weight the first in-focus position based on the reliability of the first in-focus position calculated in a past to calculate the first in-focus position.

11. The information processing apparatus according to claim 1, further comprising a selecting unit configured to select a normal mode and a high accuracy mode regarding autofocus in a switchable manner, wherein the driver is capable of moving, if the normal mode is being selected, the focal position of the image pickup device to the calculated first in-focus position based on an autofocus instruction input by the user, and moving, if the high accuracy mode is being selected, the focal position of the image pickup device to one of end points a search range with reference to the calculated first in-focus position based on an autofocus instruction input by the user.

12. An information processing apparatus, comprising:

an obtaining unit configured to obtain a manually-taken object image group, the manually-taken object image group including a plurality of object images, the plurality of object images being generated by taking images of an object while moving a focal position of an image pickup device manually;

a first calculator capable of calculating, based on pieces of contrast information on the plurality of object images in the obtained manually-taken object image group, a first in-focus position of the image pickup device relative to the object by performing fitting using a predetermined function;

a selecting unit configured to select a normal mode and a high accuracy mode regarding autofocus in a switchable manner;

a driver capable of moving, based on an autofocus instruction input by a user, (i) if the normal mode is being selected, the focal position of the image pickup device to the calculated first in-focus position, and (ii) if the high accuracy mode is being selected, the focal position of the image pickup device to one of end points a search range with reference to the calculated first in-focus position; and a third calculator capable of calculating, if the high accuracy mode is being selected, a third in-focus position of the image pickup device relative to the object based on pieces of contrast information on a plurality of object images generated by taking images of the object while moving the focal position automatically within the search range.

13. The information processing apparatus according to claim 1, further comprising storage configured to store a map-for-calculation including a plurality of divided areas, wherein the first calculator is configured to calculate divided-area in-focus positions for the plurality of divided areas based on pieces of contrast information on a plurality of divided areas of the object image, the plurality of divided areas of the object image corresponding to the plurality of areas of the map-for-calculation, and to calculate the first in-focus position based on information on the divided-area in-focus positions.

14. The information processing apparatus according to claim 13, wherein the image pickup device is capable of taking an image of the object at an arbitrary image pickup position on a 2D (two-dimensional) plane parallel to a mount surface on which the object is mounted, the driver is capable of moving the image pickup position on the 2D plane, and the map-for-calculation has a larger area than an image pickup area of the object image, the map-for-calculation containing the image pickup area, the map-for-calculation being moved as the image pickup position is moved.

15. An information processing method, executed by a computer, comprising:

obtaining a manually-taken object image group, the manually-taken object image group including a plurality of object images, the plurality of object images being generated by taking images of an object while moving a focal position of an image pickup device manually;

obtaining an automatically-taken object image group, the automatically-taken object image group including a plurality of object images, the plurality of object images being generated by taking images of the object while moving the focal position of the image pickup device automatically;

calculating, based on pieces of contrast information on the plurality of object images in the obtained manually-taken object image group, a first in-focus position of the image pickup device relative to the object by performing fitting using a predetermined function;

calculating reliability of the calculated first in-focus position;

moving, based on an autofocus instruction input by a user, if the reliability of the calculated first in-focus position has a value larger than a predetermined threshold, the focal position of the image pickup device to the calculated first in-focus position; and calculating, if the reliability of the calculated first in-focus position has a value smaller than the predetermined threshold, a second in-focus position of the image pickup device relative to the object, based on the calculated first in-focus position and based on pieces of contrast information on the plurality of object images in the obtained automatically-taken object image group.

16. A non-transitory computer readable medium storing a program, causing a computer to execute the steps of:

obtaining a manually-taken object image group, the manually-taken object image group including a plurality of object images, the plurality of object images being generated by taking images of an object while moving a focal position of an image pickup device manually;

obtaining an automatically-taken object image group, the automatically-taken object image group including a plurality of object images, the plurality of object images being generated by taking images of the object while moving the focal position of the image pickup device automatically;

calculating, based on pieces of contrast information on the plurality of object images in the obtained manually-taken object image group, a first in-focus position of the image pickup device relative to the object by performing fitting using a predetermined function;

calculating reliability of the calculated first in-focus position;

moving, based on an autofocus instruction input by a user, if the reliability of the calculated first in-focus position has a value larger than a predetermined threshold, the focal position of the image pickup device to the calculated first in-focus position; and calculating, if the reliability of the calculated first in-focus position has a value smaller than the predetermined threshold, a second in-focus position of the image pickup device relative to the object, based on the calculated first in-focus position and based on pieces of contrast information on the plurality of object images in the obtained automatically-taken object image group.

17. A vision measuring apparatus, comprising:
an image pickup unit capable of generating object images by taking images of an object;
an obtaining unit configured to obtain a manually-taken object image group, the manually-taken object image group including a plurality of object images, the plurality of object images being generated by taking images of the object while moving a focal position of the image pickup device manually, the obtaining unit being capable of obtaining an automatically-taken object image group, the automatically-taken object image group including a plurality of object images, the plurality of object images being generated by taking images of the object while moving the focal position of the image pickup device automatically;
a first calculator capable of calculating, based on pieces of contrast information on the plurality of object images in the obtained manually-taken object image group, a first in-focus position of the image pickup device relative to the object by performing fitting using a predetermined function;
a reliability calculator configured to calculate reliability of the calculated first in-focus position;
a driver capable of moving, based on an autofocus instruction input by a user, if the reliability of the calculated first in-focus position has a value larger than a predetermined threshold, the focal position of the image pickup device to the calculated first in-focus position; and
a second calculator capable of calculating, if the reliability of the calculated first in-focus position has a value smaller than the predetermined threshold, a second in-focus position of the image pickup device relative to the object, based on the calculated first in-focus position and based on pieces of contrast information on the plurality of object images in the obtained automatically-taken object image group.

* * * * *